US009117167B2

(12) United States Patent
Goranson

(10) Patent No.: US 9,117,167 B2
(45) Date of Patent: Aug. 25, 2015

(54) SYSTEM AND METHOD FOR SCALABLE SEMANTIC STREAM PROCESSING

(75) Inventor: Harold Theodore Goranson, Virginia Beach, VA (US)

(73) Assignee: Sirius-Beta Corporation, Virginia Beach, VA (US)

( * ) Notice: Subject to any disclaimer, the term of this patent is extended or adjusted under 35 U.S.C. 154(b) by 145 days.

(21) Appl. No.: 13/290,439

(22) Filed: Nov. 7, 2011

(65) Prior Publication Data

US 2012/0117114 A1 May 10, 2012

Related U.S. Application Data

(60) Provisional application No. 61/410,395, filed on Nov. 5, 2010.

(51) Int. Cl.
*G06N 5/00* (2006.01)
*G06N 5/04* (2006.01)
*G06F 17/30* (2006.01)
*H04N 7/18* (2006.01)

(52) U.S. Cl.
CPC .............. *G06N 5/00* (2013.01); *G06F 17/3002* (2013.01); *G06N 5/04* (2013.01); *H04N 7/181* (2013.01)

(58) Field of Classification Search
CPC ....... G06N 5/04; G06F 17/3002; H04N 7/181
USPC .......................................... 348/143; 707/776
See application file for complete search history.

(56) References Cited

U.S. PATENT DOCUMENTS

| | | | |
|---|---|---|---|
| 7,933,989 B1 * | 4/2011 | Barker et al. ................. | 709/224 |
| 2008/0208589 A1 * | 8/2008 | Cross et al. ................... | 704/275 |
| 2010/0157049 A1 * | 6/2010 | Dvir et al. ..................... | 348/143 |
| 2010/0268769 A1 * | 10/2010 | Goranson ..................... | 709/203 |
| 2011/0307451 A1 * | 12/2011 | El Haddi et al. .............. | 707/673 |
| 2014/0040222 A1 * | 2/2014 | Schmitz et al. ............... | 707/705 |

* cited by examiner

*Primary Examiner* — Grace Park
(74) *Attorney, Agent, or Firm* — Dickstein Shapiro LLP

(57) ABSTRACT

A system for collaborative analysis from different processes on different data sources. The system uses a unique approach to lightweight temporary data structures in order to allow communication of interim results among processes, and construction of semantically appropriate reports. The data structures are generated in near real time and their lightweight nature supports massive scaling, including many diverse streaming inputs.

17 Claims, 8 Drawing Sheets

SYSTEM AND METHOD FOR SCALABLE SEMANTIC STREAM PROCESSING

CROSS REFERENCE TO RELATED APPLICATIONS

This application claims the benefit of U.S. provisional patent application 61/410,395, filed on Nov. 5, 2010, the disclosure of which is incorporated herein by reference in its entirety.

Embodiments described herein incorporate principles described in U.S. application Ser. No. 12/798,487 filed on Apr. 5, 2010, and Ser. No. 12/924,999 filed on Nov. 5, 2010, the disclosures of which are incorporated herein by reference.

FIELD OF THE INVENTION

Embodiments described herein generally relate to transforming information and managing the flow of information, and more specifically to a system, data structure, and method used to process data flows and identify information of interest.

BACKGROUND OF THE INVENTION

Vast amounts of information are increasingly available, in part because of the growing development of rich sensors and information gathering devices. A growing proportion of this information can be characterized as flows or streams. In order for this information to be useful, it needs to be interpreted. Many methods currently exist to extract useful information from a single flow of a single data type, but these methods do not successfully combine flows of different data types for situational evaluation in near real time and on a large scale.

Generally, a multiprocessor computing environment accomplishes tasks by utilizing connected multiple processors as computing elements. The connection can be by many means, ranging from discrete processing devices that are networked together to those that have processors more integrally connected within a single device. Often, the processors consist of diverse types, optimized for different functions. For example, some processors may be optimized for video feature extraction, while others may be optimized for general reasoning. These different processors may perform analysis and transformations on very different data types.

Multiprocessor systems divide the work of the system into tasks that each processor handles. Processors communicate with one another to determine the nature of the tasks, coordinate the execution of those tasks and synthesize the results. Situationally aware multiprocessor systems are multiprocessor systems that can adjust the processes that each processor executes, change the way that tasks are defined and assigned, and adjust the communication mechanisms based on the result of computations across processes. Such an in-process synthesized multiprocessor result characterizes a "situation" that guides future tasks.

Multiprocessor systems can include parallel processing, distributed processing and virtual machines. Processors can be single or grouped and can include processing units such as those found in computers, mobile devices, gaming consoles, video cameras, military sensors, medical sensors or other devices with computing elements or logical devices.

While situationally aware multiprocessor systems provide the advantage of dynamically adapting to new information, there are many drawbacks, disadvantages and deficiencies. Processing tasks can be generally divided into: (a) those that do the basic work, for example watching a video stream for a specific behavior; (b) those that communicate partial situated information (meaning information that is relevant to the task of a single processor but created by another processor); and (c) those that look at the big picture, coordinating the work. If not properly designed, the latter two processing task types in situated multiprocessor systems grow very quickly in computational cost. This limits the scale of the system and the speed with which combined results can be provided to a user.

In the field of information processing, there are methods for transforming information variously known as stream processing, event processing, complex event processing or event stream processing. These systems are designed to deal with continuous flows of information. Examples are sensors (or otherwise supplied streams of metrics) controlling a manufacturing operation or processing plant; monitors that watch financial markets; sensors used in a military intelligence environment; and systems that watch multiple television stations and read internet-conveyed feeds, extracting patterns of interest. These systems may use specialized processors or be hosted on conventional computers or multiprocessor systems, and may include different data types in their streams. Such stream processing systems can ingest many streams; they work by inserting processors in these streams producing possibly both discrete data and transformed streams.

Processors in such systems can interact with others producing discrete and continuous data about a complex situation. While these systems provide distinct advantage in handing streams and events, they generally cannot adapt quickly. The reason is the assignment of processors and tasks to streams is currently pre-programmed in a well defined manner that is largely constrained by the types of information they are programmed to handle. The difficulty of adapting to new situations is amplified in stream processors compared to general multiprocessor systems. In other words, these systems do not reprogram themselves based on local, unexpected situations in a significant, cost-effective and scalable way.

Teachings in the field of situated reasoning can be helpful in analyzing flows of information. The teachings in this field go by many names, including system engineering; reasoning in context, modal logic, non-monotonic reasoning, and situation theory. A fundamental idea is that considering the system or situation as a whole adds new knowledge to many of the constituent processes. The fundamental mechanism is that information flowing from each process can be combined into one or more situations, some of them relevant situations that can influence a given process. One example taken from military intelligence involves the following: one sensor reports rustling in trees, another a motor sound, a third source of information is a discrete report, and a fourth is a memo reporting a stolen tank. None of these by themselves would flag a threatening situation, especially if tanks traveling under a jungle canopy is unanticipated; together they can be fused to produce a likely conclusion.

In a dynamic stream processing system, the actual depth of a process can be adapted in real time based on the situated reasoning extracted from other processors. For example, the processor or processors associated with an airborne radar can have processing tasks adjusted to analyze in more depth and to add certain vehicle recognition algorithms.

There are several methods for reasoning about and designing logical systems for such situated reasoning. The most comprehensive is situation theory, a formal system of logic designed to address this generic problem. Situation theory provides formal tools that can be applied to situated reasoning systems. A problem is that there has been no practical implementation of situation theory in processing systems because proposed architectures carry too much logical overhead, among other things.

In the field of feature processing, a "feature" is a structured piece of information that has been extracted from a stream or data item and that has utility. A simple example of a feature is used in object recognition from video. In this example, a processor associated with a video camera looks at frames of its video comparing it to certain references with a goal of identifying a tank. In doing so, it will find characteristic visual patterns (as features) that indicate the possibility that the image includes a tank. That possibility can later be reported as a semantically expressed fact, possibly with an associated probability.

The general notion of feature abstraction is widely used in many computerized applications, under different names. (Common allied concepts are Kalman filtering, Bayesian inferencing and Markov chaining.) For example, in natural language recognition, a processor will seek certain grammatical and semantic structures than can be said to be features in this way.

One use of feature structures is in the creation of b-frames for video compression. When a video compressor finds a feature or feature structure that spans multiple frames of the video, and it seems to change from video frame to video frame in an ordered manner, then it can be identified with a data structure known as a b-frame, which is a single representation for all those frames in the compressed file. On decoding, the b-frame is uncompressed once, then placed with suitable distortion in the video frames. An example may be where a camera is stationary with mountains in the background and a car passes in the foreground. One b-frame may be formed of the mountain background which is compressed and saved once for the duration of the video, using component features characteristic of a mountain and representable by the compressor as mathematical functions. A second b-frame would encode the car, which is similarly encoded and stored once, but placed and distorted on the video frames differently for each video frame, also using mathematical functions to encode the placements and distortions. Thus, the b-frames in video compression are single representations that can be used in multiple video frames, with or without alteration by mathematical formulas across frames.

In video compression, features that are more important to comprehension have been identified by a motion picture experts group (MPEG). These are both the features that convey semantic meaning when interpreted by a viewer and that provide the basic mathematical structures for representation in the compressed stream.

Representations such as b-frames are very useful when applied to processor-specific stream processing because they can be scalably implemented, be extracted quickly and the abstraction can be flexibly defined. A difficulty is that existing approaches are strongly domain-specific. In the current art, there is no specified layer of abstraction that can unify something like b-frames across processes of the same type so that processes can share constructive semantics. Moreover, in the current art, there is a lack of a similarly defined abstraction layer that can allow b-frame constructed semantic exchange across diverse stream types (audio, video, text strings, MRI output, SAR feeds and so on) to support the associated interpretive processes.

In view of the foregoing, there also exists a need in the art for a scalable system capable of collaborative analysis from different processes on different data sources. To do so, the system should create lightweight temporary data structures in order to allow communication of interim results among processes, allow shared construction of relevant situations and allow construction of semantically appropriate reports to users. The data structures should support near real time analysis, allow growth to large scale systems and accept diverse streaming inputs.

DETAILED DESCRIPTION OF THE INVENTION

Figure 1:
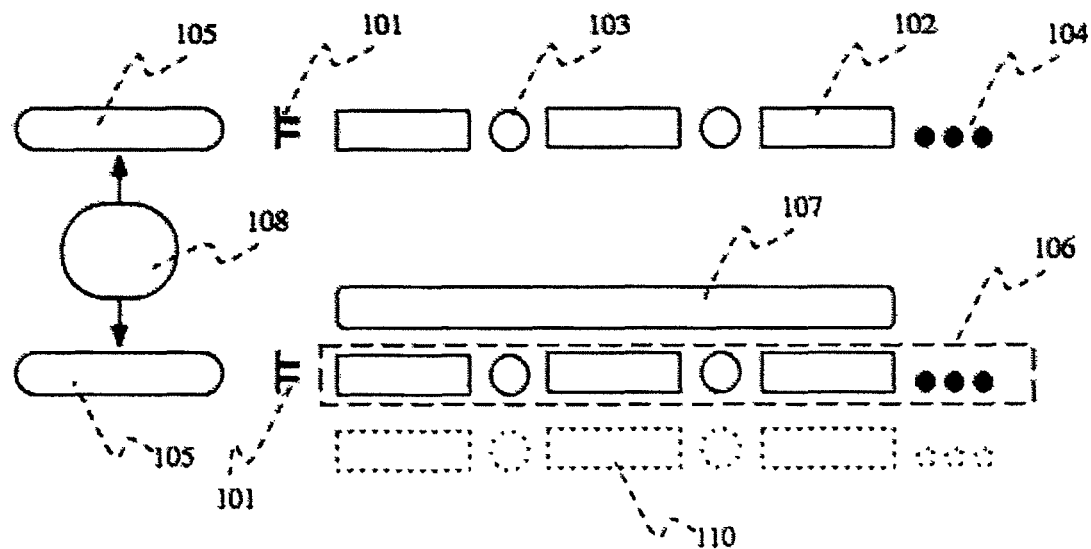
FIG. 1 illustrates a general situation theory data structure.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made.

Embodiments described herein are designed to be used with a processor system. The processor system may be any processor system, for example, a personal computer, a minicomputer, a mainframe computer or a multiprocessor system as described above. The processor system, often called a computer, will typically include a processor, a display, at least one input device, and random access memory (RAM), but may include more or fewer of these components. The processor system can be directly connected to the display, or remotely over communication lines such as telephone lines or local area networks. Multiple processor systems may be interconnected to perform discrete or shared tasks. The multiprocessor systems may include computer software embodied on non-transitory computer readable medium that provides instructions for performing tasks. Alternatively, multiprocessor systems can be implemented as virtual mobile processors using an agent paradigm.

Embodiments of the processor system may include both commercial off-the-shelf (COTS) configurations, and special purpose systems designed to work with the embodiments disclosed herein, so long as the hardware used is capable of performing the tasks required by specific embodiments.

An example embodiment involves monitoring a number of sensors of different types covering the same or related situations. As an example, a system may be constructed for the surveillance of a landscape, and can include data and data streams from numerous video sensors covering various angles of the landscape, audio sensors at different locations, satellite imaging, motion sensors, and various other sensors that all must be combined to understand situations developing on the landscape. The tasks include merging partially recognized patterns from processors associated with one stream to similarly intermediate results from large numbers of processors of other streams that may either be the same type (like video feeds) or different types (like those from synthetic aperture radar images) which may employ quite different recognition technologies.

Another example embodiment involves analysis of a "virtual enterprise." A virtual enterprise is an integrated set of companies that work together to address an opportunity and act as if it were a stable, single enterprise. Forming such integrated enterprises from a very large pool of candidates is a known difficult problem. It can be simplified if the product and desired values from the enterprise (for example, profit) are seen as situations and the combination of processes from the various companies are seen as resulting in the desired situation. In this environment each "sensor" monitors and analyzes a manufacturing or business process and its associated information stream. Identifying an example situation that results from certain combinations of processes is analogous to identifying a threatening situation from intelligence sensors. In the virtual enterprise case, the system assists in the evaluation of possibilities of a potential product or service with the combined process flows and their associated firms that make up the enterprise and that are optimally engineered for the opportunity. The system can then assist in the operation of the enterprise, providing introspective process, product and partner adjustments.

The intelligence sensor case and the virtual enterprise case are similar. In both cases, large numbers of streams are evaluated for a report on the "right" situations (i.e., situations identified as important in the context of the data being analyzed). In the intelligence sensor case, the goal is a report on one or more conditions of interest to the analyst. In the virtual enterprise case, the goal is a set of optimized partners and process plans. One difference is in the types of data that pass through the system and the desired solutions. A more fundamental difference is that information from the streams in the intelligence sensor case form the absolute set (with no extraneous information) that define the situations of interest. In the virtual enterprise case, the processes are not "live" (in the formation stage, because the enterprise is not yet operating), but are iterative simulations of various informed combinations.

The intelligence sensor case can be challenging in the sense that real time processing is required and quite different sensors (for example video and acoustic) are involved. The virtual enterprise case is less challenging in this way because all the process models from various sources can be represented by the same family of event types. But, it is more challenging in that the end goal, the reported situations of products and services, is generally only vaguely defined at first and then is refined as the system identifies possibilities.

Both cases require massive scalability and the ability to have processors collaborating in a federated, distributed way, connected by lightweight messages. Both cases involve stream processing of the type often called "complex event processing," and both must incorporate a variety of legacy systems and methods.

In embodiments of the invention, these two cases can be handled similarly, using a complex event processing paradigm possibly employed on networked general purpose processors or a more specialized system, such as IBM's InfoSphere Streams™ system possibly hosted on Cell Broadband Engine Architecture™ processor hardware. Alternatively, a more distributed, internet-based system is possible, using the programming philosophy of functional reactive methods, for example.

Embodiments of the invention include the utilization of an integrated two-sorted logic, based on situation theory principles, to abstract data from multiple data streams of different types. Embodiments can utilize a situational theory framework that incorporates group theory principles to facilitate scalability.

The description of the invention is organized thus: the general logical philosophy and formal foundation are outlined as two-sorted logic in situation theory and the invention's method of unifying the two sorts is described as "semantic b-frames." On this foundation, a general architecture is described, which is then instanced in a specific implementation of an intelligence scenario and separately a virtual enterprise scenario, using the attached figures.

Logicians have long known that first order logic is not very useful for many of the kinds of practical reasoning processes that humans and computers perform. A successful framework for addressing this inadequacy has been developed under the banner of "situation theory." In this theory, there are two sides of an equation that describes a logical condition. On the right hand side are facts and statements of logic. On the left hand side are "situations." A situation is the part of the world, or environment, in which the facts and deductions of the right hand side are "situated." Between the two is a relation symbol that looks like an equals sign with a bar affixed on the left side. Such an equation is often read as the facts on the right hand side "being true in" (or "being supported by") the situation on the left.

Situations, sometimes called context or environment, can often make all the difference in the interpretation of facts. If you know the situation is a war zone, then something that looks like a tank should be taken seriously as a tank. If the situation is an amusement park, then the thing that looks rather like a tank is likely to be an amusement ride for children.

Situations can quite literally change the semantics of facts as they are interpreted. Situation theory was originally designed to deal with the simple case of true or false; a fact standing alone like "it is raining," could be true or false depending on the situation in which it exists; you have to know the situation. Embodiments of the invention extend this to semantic interpretation. For example, the fact: "Kim is a queen" could mean several things depending on the situation. Perhaps this is a literal statement regarding Kim's status as a queen, or maybe merely a statement denoting a role in a play.

As an example, in the intelligence sensor embodiment, there are situations that present themselves through the (potentially live streaming) feeds coming in that provide information about the world to the system. And there is also a collected set of possible conclusions that an analyst wants, which can be expressed as a separate set of situations. In this case, the process system is configured to process the situations hidden in the combined data streams to see if they match the situations of interest to the analyst. A typical use will annotate the relevant components of the streams with this situated information to inform more conventional, human assisted analysis further on.

In the virtual enterprise embodiment, there may be a situation defined by a set of consumers with certain needs and desires, plus another situation of many potential partners and their processes and capabilities. The system computes the situation of a described enterprise (or several possibilities) that bridges these two.

Embodiments of the invention use "semantic b-frame" data structures that are loosely inspired by the "b-frame" concept used in video compression. The current art in video compression uses a collection of techniques. Some of them compress each frame of a video as if it were a photograph. Other techniques leverage the fact that these are "moving" pictures; in many videos, there are scenes where some objects move from frame to frame and some are stationary. An example is a stationary camera looking at a landscape with cars travelling through it. A compressor can save space by letting the decoder know that the mountain in the background on the next 200 frames is exactly like the one in a given frame, so just copy it from that frame (or actually any of the 200 frames that seems best). It can similarly say that the car in the next 60 frames is the same as the one on the left of this frame but it will move as we specify. And because the road is curvy and coming toward the camera, the car will change shape and add new features in each frame, but in a smooth way that can be encoded more efficiently as transforms on an object, rather than making 200 copies of slightly different objects (one for each frame in the scene). A b-frame is a representation of that object across frames.

The encoded representation uses information from patterns from both directions in the video, meaning frames both before and after a specific frame. (The "b" stands for "bidirectional" frames.) The display of an object, or any persistent pattern can reference frames from before or after in representing the transformation of the object. The representation in a b-frame contains information about the frames of interest, the patterns of interest and their transformations. It is possible to code the interactions among several b-frames, representing objects or behavior of interest.

In video encoding, there are several steps in compressing a file. An encoder looks at each frame and tries to discern patterns within that frame, based on stored criteria. These are then compared to patterns similarly found in nearby (ideally, but not necessarily adjacent) frames. The similarity measures are determined by the transforming functions built into the decoder. Then, possibly in a second pass through the video, each frame has its qualifying b-frame pattern replaced by code giving a pattern plus code on how to transform it for the desired area of that specific frame.

This is a "lossy" process; the compressed image has less information than the original image. Cognitive experts have determined which information is disposable, and which useful and these rules are factored into the mathematics (of capturing the patterns of b-frames and determining their transforms from frame to frame). Advanced approaches to object recognition in video can use this process for the additional function of identifying patterns to help identify patterns of interpretive interest. The processes of compression and object recognition can be similar because the algorithms used to determine what can be thrown away are based on what is important for the interpreter (human or processor) in understanding the frame. Because of this dual purpose of b-frames (object recognition and stream compression), embodiments of the invention can be applied to compression of individual and combined streams, each compressed file containing collaboratively achieved information from other streams.

Considering the same object across many frames in the same video always gives more information about the nature of the object than can be gained from a single frame. The same can be said of looking at the same object across many frames in different videos. So, even if the processing system does nothing else, it can determine patterns and transforms across video streams as if they were all part of the same video, but temporally folded into one b-frame system. In this case b-frames would be constructed from information from all feeds. In the example of the car across mountains, the nature of the b-frame now has to evolve from a two-dimensional pattern to the more complex three-dimensional pattern but with two-dimensional projections. But the mechanism is the same: mathematical transforms relate versions of the b-frame frames across all the videos.

In interpreting video streams (for example) in the intelligence sensor embodiment, the goal is to identify different patterns of interest, indicating objects and behaviors of interest. Applying two-sorted logic to this example, the right hand side includes a single stream of b-frames that represent the patterns from a single video. The relationships between b-frames on different frames would be the transforms one from the other just as in the compression case. Those b-frames and their transforms constitute facts and relations that can be mapped into abstract structures on the left hand side that represent the "situation" of everything we know from that one video.

The transforms can then be conveyed from the left hand side to the right as annotative, interpretive functions that operate on each object in the video in turn. Using this system, representations of objects in the world are right hand side elements (b-frames). The analysis you perform on them to make a sequence of related objects on the right hand side are performed by structures on the left hand side (similar to b-frame transforms). As a result, according to situation theory, the right hand side then has what is known, and the left hand side has the context of how and why it is known.

This use of two-sorted logic facilitates analysis in cases where there are several data sources (such as videos) of the same scene, perhaps at the same time and perhaps different times. A different perspective, different equipment, different light and so on can make all the difference. To automate object recognition over several, or perhaps hundreds of video streams, the system connects the situations of each into a larger situation for which it already knows every frame (so far) of every video. Then, instead of the informative, interpretive transforms coming from and affecting any one object, they come from potentially everything seen by every sensor.

Embodiments of the invention include "sematic b-frames" or "sb-frames." These encompass a similar concept as the b-frames in video, but they contain information about what a pattern might indicate (some analysis of what the data may represent in a situation) rather than merely data used to display a frame on a screen (as in b-frames). For example, instead of identifying a moving silver blob on a screen, the sb-frame may identify an object with deduced physics: "this is a highly kinetic, man-made item that can destroy many objects if they collide." In this case, the "patterns" are facts and the objects they indicate have semantic meaning that can directly feed expert systems or human analysts.

Sb-frames are described above with reference to video, but they are not limited to being representations of patterns of video streams. Sb-frames can be extracted from any sort of streaming (or otherwise structured) information, from any sort of sensor that streams information. These can be streams of discrete information, like web pages, images, emails or structured intelligence communications.

Given the above, one of skill in the art can recognize the equivalent to b-frames in other stream types that could be adapted to form sb-frames in these stream types. When the streams are natural language, then the features of interest are key words, phases and perhaps interpretive intonations. These would be the b-frames native to this streaming (or data) type.

Similarly, synthetic aperture radar (SAR) images could use b-frame types similar to those of full motion video, but because the information includes three dimensional data, the pattern types are built of surfaces and boundaries plus Kalman profiles, for example, rather than the shapes and edges of two dimensional images.

The equivalent of b-frames in acoustic sensors are sonic profiles. SIGINT receptors which often capture undifferentiated, encrypted signals with unknown information types would abstract their version of b-frames at a more abstract level, useful for geometric and quantum logics used in the art.

Each media type and/or stream protocol has some features that compose the equivalent of a b-frame vocabulary. All of these are eventually refined to a semantic level so that the user can understand what is recognized. Thus, though SAR object recognizers use fairly primitive shapes natively, these are aggregated into descriptions by some subsequent process to for example report to the user: "this is likely a tank."

As it happens, every "b-frame" for a media type usually gets enriched with human-understandable semantics. An important aspect of embodiments of the invention is that they immediately convert this information to semantic primitives, elevating the "b-frame" space of each media type to a universal semantic b-frame space. This allows features to be related not just across video frames for instance, but (for example) from a video frame to an acoustic capture.

The data representation of these frames is designed to bridge an algebraic representation with a semantically interpretable logical representation. The algebraic representation is equivalent to our previously described right hand side objects and is cheaply computable as well as being readily manipulated by the group theoretical operators of embodiments of the invention.

The semantic representation in a common embodiment will be first order logic. The two-sorted logic of situation theory binds these representations.

Specifically, embodiments of the invention use mathematical representations to define left hand side structures of a two-sided logic and to govern how those structures relate the right hand side patterns by deductions through group-theoretic transforms. The requirements are that the mathematics be readily implementable and massively scalable on a variety of multiprocessor systems, and be codable using formal principles for validation. Ideally, it should allow users of the system to audit any conclusion by recovering the transformative relations so that any deductions or conclusions could be traced back to the collection of feeds and the specific, originating items therein.

Embodiments of the invention involve the semantics of machine cognition in focused domains. In the intelligence sensor domain, the focus is on quickly identifying primitives (for example corners, pattern motions, shapes) and key objects or behavior (for example tanks, moving columns of persons, threatening or potentially threatening behavior) in the context of desired analyses. In the virtual enterprise embodiment, this is on processes in the context of value delivered to customers (in terms of a product) and the enterprise partners (in terms of dollars or other strategic goals).

Group theory can be used for characterizing and analyzing structure in a formal and consistent way, is strictly algebraic and uses algebraic abstractions. Implementations of group-theoretic products on processor systems are readily scalable to massive systems. The products of the invention define a special domain characterized by right hand side logic and use a wreath product to characterize the behavior of our left-hand-side inspired sb-frames over the logical tokens within that domain.

A "wreath product" is a well known product in group theory. Stated simply, it is an operation between two groups using a semidirect product to create permutation groups. The mechanism is graphically illustrated herein, showing how wreath products are used to transform groups. In other words, a wreath product can be used as a model defining how underlying information (a "fiber group") is transformed over time. The fiber in this case is equivalent to the semantic b-frame (or sb-frame structures) and a control group (which is said to be wreathed into or over the fiber group) is equivalent to how it morphs from instance to instance in the various streams.

This wreath product, therefore, produces a set of transformations that unifies patterns from the cognitive medium. The quality valued in this is the ability to model cause; the "control group" can be semantically placed to model the causal behavior that motivates the transformation of the target (the "fiber" as the sb-frame) group through a sequence that creates transformed copies of that group elsewhere in the situation. These copies present an auditable history of what caused what, which is a desirable aspect of the system.

Groups are mathematical objects with simple properties—a group is a collection of mathematical objects and relationships among them. The relationships are rather simple, exposing structure. These simple rules allow a two-sorted algebraic world to exist. If the rules within the group are considered a (right hand side) logic, then a separate set of rules operate on and transform groups as a (left hand side) metalogic or second logic. This property—that you can define a group in a two-sorted system—allows the system to model itself if so desired.

The relationship rules that define a group are: if you relate two objects, the relationship is an object in the group; it does not matter in what order you relate objects; among the objects is a simple identity object such that when you relate to it the relationship is the same as the unrelated state; and for every object in the group there is another object, an inverse such that when the object is related to its inverse you get the identity object.

A general system for supporting two-sorted situation theory in processing systems using category theory is described in U.S. application Ser. No. 12/798,487, filed on 5 Apr. 2010. The system described in U.S. application Ser. No. 12/798,487 supports general and deep reasoning, it uses a different mathematical object (the category) for the left hand side than the embodiment of the invention described herein (which uses groups).

The use of groups provides significant benefits in a processing environment. They are computationally efficient and the art provides significant known techniques for implementing them.

FIGS. 1 through 4 show the relationship between the general foundation of situation theory and the special case used in embodiments of the invention.

FIG. 1 illustrates the general foundation for the situational theory data structures used by embodiments of the invention, diagrammatically representing a typical equation. The "is supported by" relation operator 101 (an equals sign with a vertical line at one end) divides the equation into right and left hand sides. The right hand side consists of values 102 linked by relations 103. An arbitrarily long sequence 104 is possible.

The values 102 and relations 103 can be any of a number of mathematical expressions. One instance is where values 102 are algebraic variables and relations are algebraic operations, for example as polynomial or integral expressions.

A common instance has the values 102 as predicate statements or facts and the relations 103 as logical or set-theoretic operators. In this instance, the right hand side is a logical deduction or similar statement. A simple example of a right hand side would be "Ted is a man" (102) "and" (103) "Ted is in Australia" (102) "and" (103) "It is raining in Australia" (102) "so" (103) "Ted is wet" (102).

This would not "be supported by" (101) the situation (105) "Ted has an umbrella" Nor the situation (105) "Ted is really not in Australia."

In essence, the right hand side can be any sort of well-formed mathematical or logical expression with suitable axiomatic foundation. In particular, any well-formed logic is supported, including modal, probabilistic (fuzzy, Bayesian), linear, intuitionistic and higher order logics.

In situation theory, the left hand side of the equation expresses the situations 105 in which the expressions on the right hand side hold, or alternatively "are true." In a specific embodiment of situation theory, these situations are expressed as categories. Consider the bottom half of FIG. 1. The right hand side of the equation has an expression 106 as just described. An operation abstracts structure 107 from the expression 106. In the logical case, the structure 107 is a topological characterization of the expression 106. This structure 107 informs the structure of the situation 105 on the left.

For example, supposing we had the right hand side assembly (expression 106) already used: "Ted is a man and Ted is in Australia and it is raining in Australia, so Ted is wet." Because this statement has well behaved structure, there are in the art several techniques for extracting that structure as 107. A common example would be to consider the statement as an example of a Heyting algebra, in which case the structure 107 is a topology and the situation 105 is a category that defines that topology.

Many such abstraction techniques exist in the art that result in different mathematical objects (structures 107). It is a feature of the invention that this diversity is supported. The described embodiment allows for a variety of expressions 106 because the sb-frame expressions are so varied.

FIG. 1 illustrates a typical embodiment where two expressions 106 are related through operations between categories (structures 107) by mapping to objects on the on the left hand side. An example may be a stream of facts appearing in an expression 106 on the bottom of FIG. 1 that are characterized by the situation 105 on the bottom of FIG. 1. A pre-existing ontology exists as the right hand side expression on the top of FIG. 1. It has a characteristic category (situation 105), determined by an abstracted structure (expression 106) (not shown in the top expression for graphical clarity).

The interpretation of the right hand side expression on the bottom of the figure by the ontology at the top is determined by an operation 108, between categories. The nature of the categories (situations 105) and the operation 108 between them varies according to the domain of application.

For example in the category-theoretic case, structure 107 is a topology defined by the nature of possible categories (situations 105). Because the logical representations on the right are mapped to categories on the left, reasoning over situations is now reduced to a mathematical problem of the mathematical relationship between two mathematical objects. As they are categories, the operation 108 is an adjoint functor which can be implemented by functional programming techniques.

For example, suppose that we had the situation 105 already described by the facts it supports ("Ted is a man and Ted is in Australia and it is raining in Australia, so Ted is wet."). And we had another situation 105 described by general facts about weather: "Weather is a local phenomenon, and Australia is a very big country so it can be raining in some parts of Australia and not others."

A human would reason about these two situations, originating perhaps from different sources. The invention automates the operation 108 as a second sort of (left hand side) logic over mathematical objects representing the two collections of facts. In the below described embodiment, the situations 105 are represented as groups and the operations 108 are group products It is a desirable feature of the invention that powerful reasoning over complex situations can be accomplished by computationally simple mathematics.

This situational theory framework is thus a general method of implementing a two-sorted logic on the left hand side over expressions on the right hand side using the formal integrative mechanisms of situation theory and the abstract power of category theory. It has a specific novel application in temporally dynamic semantic interpretation and/or narrative interpretation by complex dynamics of analogy and ambiguity.

Figure 2:
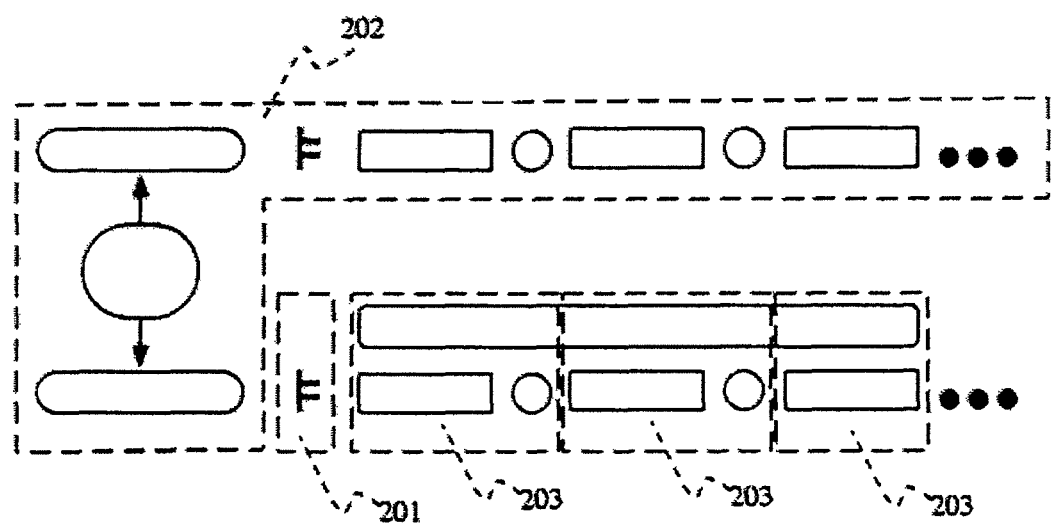
FIG. 2 shows a situation theory data structure adapted according to an embodiment of the invention.

This framework is extraordinarily flexible. FIG. 2 illustrates the means by which it is simplified for use by embodiments of the invention.

A general case in which this framework has great power is the case in which there is a complex expression (shown at the bottom of FIG. 1) which requires interpretation or analysis involving many individual or simultaneous references or situations. In this case, a robust left hand side calculus is required. The invention has a complementary use case, with many streams that need to be analyzed and/or interpreted. Ambiguity is present in this analysis, but is not considered an enriching quality, since the goal is to minimize ambiguity. Alternately, ambiguity is shifted to features that are not high value to the analyst.

Embodiments of the invention therefore simplify the left hand side calculus to group theoretic operations rather than category theoretic described above. Also, these operations can combine the expression of ontological reference with the left hand side operation. This is schematically shown in FIG. 2. The operator 201 denotes the same relationship as in FIG. 1, namely the relationship that captures the axiomatic linkages between the two "logics" (as algebraic operations) of the left and right hand sides.

The "reference expression" in the right hand side at the top of FIG. 1 is combined directly with the operation 108. This is shown in FIG. 2 as the assembly 202. The object is to employ group theoretic products in bridging the operator 201, just as category theoretic products were used in bridging the similar relation operator 101 in FIG. 1. In the category theoretic system of FIG. 1, the values 102 and relations 103 remained in the native form of the domain presented, mapping to 107 for the operation. For example, these elements may be video b-frames. In embodiments of the invention, it is presumed that the stream can be factored from its native format into the sb-frames previously described. So in the case of video mixed with another medium, these would no longer be frames of b-frames, but sb-frames, closer to building blocks for natural language expression, for example. This refactoring is indicated as parts 203, namely as a temporal sequence of sb-frames.

Figure 3:
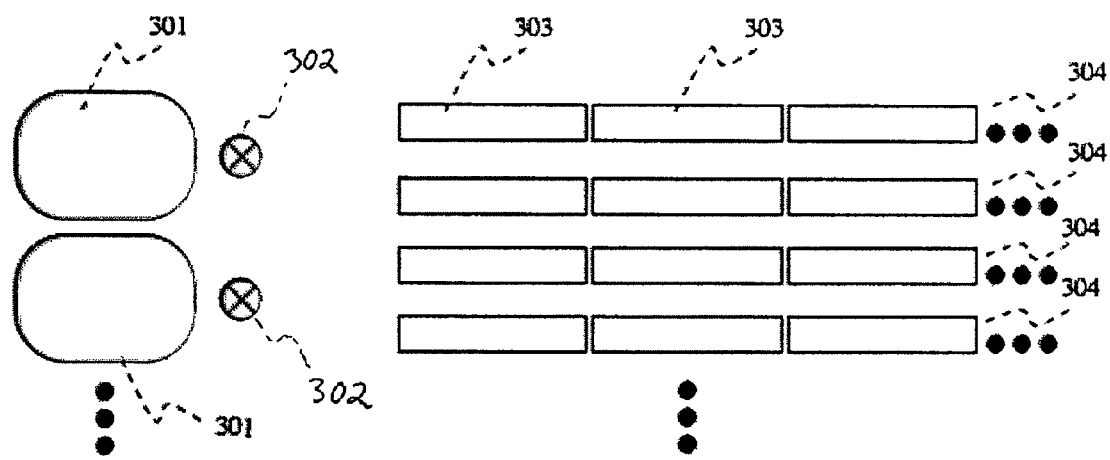
FIG. 3 provides a situation theory data structure adapted to incorporate semantic b-frame data structures according to an embodiment of the invention.

FIG. 3 illustrates the refactoring of elements and operators. The left hand side object 301 is the same as assembly 202 of FIG. 2. There are multiple instances of these objects 301, each capturing an interpretive situation of interest. In the intelligence case, objects 301 would capture objects, situations or conditions of interest in the early analysis of sensor streams. A simple example of an object 301 would be the pattern on a video indicating a tank, possibly extracted from many video streams. A more complex example of an object 301 might involve simple domestic objects and humans but exhibiting threatening behavior that is of concern and composed of sb-frames from diverse sources. In the virtual enterprise process example, objects 301 represent features of interest in the optimal enterprise, which include desired product features plus desired enterprise values such as cost and timeliness. In both domains, these will be expressed as groups and used as "control groups."

Returning to the embodiment of the invention for intelligence community and data mining, on the right hand side of FIG. 3, there are instances of sensor streams 304. These streams 304, consist of a temporal sequence of sb-frames 303 containing captured patterns that characterize the stream and which may be of interest when interpreted in the context of one or more of the conditions of interest (objects 301), stored on the left hand side. As explained above, these sb-frames 303 are representations that include stream data (such as enhanced b-frames from video frames), and connectors that relate that information (on relationships between those b-frames, for example).

In the algebraic operations of the invention, the conditions of interest (objects 301) are control groups. The sb-frames 303 are fibers (or fiber sets) and the stream 304 is a fiber group. These fiber sets and fiber groups can be thought of as representing what is known of the world (or alternatively any set of facts). The operator 302 is a wreath product (and variants) that apply the control group to the fiber group.

Generally speaking, a wreath product is applied on a fiber group by a control group to result in a series of transformed fiber groups. For example, if you had a fiber group representing a straight metal pipe, and a control group representing a bending function, then the wreath product could be used to generate a series of fiber groups representing each stage of the pipe's history as it is bent to the shape determined by the application of the control on the fiber. One can metaphorically say that the control group by itself represents the "situation" of "bendedness."

In an example, sb-frame expressions could represent a large collection of bent pipes over many instances, and the control group (objects 301) could indicate transformation to a particular shape. Then the wreathing could be used to identify all the pipes that had shapes of interest (a relatively easy task) and all of the instances of pipes that could be related by being intermediate bends resulting in the bent pipes of interest.

In the case of the illustrative embodiment, the wreath product represents the (perhaps sequential, perhaps simultaneous) collection of relationships among sb-frame expressions that may be of interest. So for example if the wreath product were just applied over many video streams, the control would hold the mathematical structure that when applied would produce the result that there is a tank that has exhibited behavior (or has other characteristics) of interest.

If the wreath product is applied over diverse streams as in the case of the illustrative embodiment, then the control group would contain the information that when applied results in the basic conclusion:
  there is a tank
  plus the information about the tank's behavior as interpreted
  plus the information about the reasoning process used across media features to produce such a conclusion.

This is similar to the pipe example, which can produce information about there being a pipe with a shape of interest, plus reporting the different stages of how it got bent into that shape.

Figure 4:
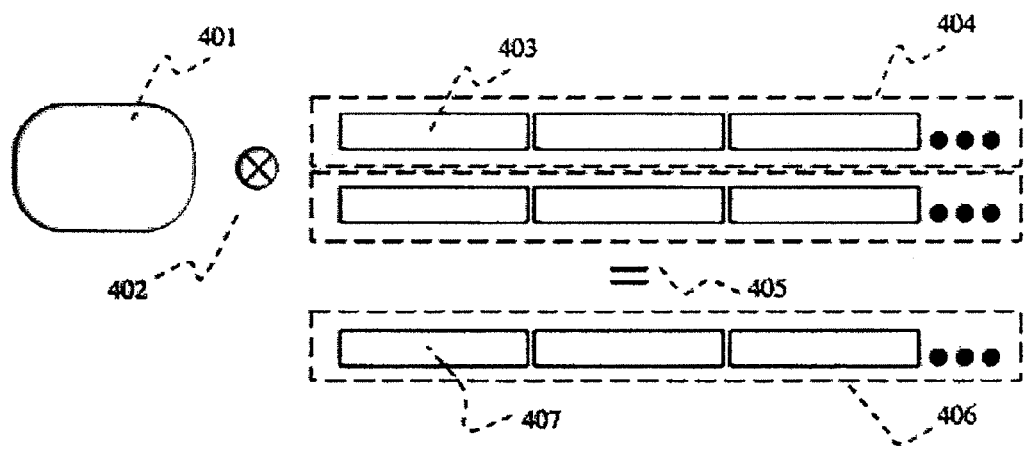
FIG. 4 shows a situation theory data structure adapted to incorporate streams.

FIG. 4 shows the control group applied in a different fashion. Where FIG. 3 showed the wreath product being applied over many sb-frame expressions (as might result from processors attached to streaming data), FIG. 4 shows the wreath product creating a synthesized sb-frame expression 406. This will be helpful in the common case where a final situation ("this is a tank") is not reached, but there is valuable partial information that needs to be exposed to other sb-frame streams.

In other words, the illustrative embodiment is not limited to operating over the relatively primitive sb-frame expressions that a special purpose processor would produce, but can generate enriched sb-frames from many sources and sequences as if there were small collaborative groups of processors reporting more complete sb-expressions. These are then used in the pool of sb-frame expressions like any other.

Multiple streams 404, consisting of sb-frames 403 are evaluated. The means by which many streams 404 are evaluated in one operation are described later in the system architecture. Large numbers of simultaneous and cached streams are evaluated at once by control groups 401, via wreath products 402. The calculated product is a single transformed stream 404, synthesized as an sb-frame expression 406. As there are many control groups 401, there are many such operations being performed over the same set of streams 404.

For example, a first stream 404 may be a sequence of information from a video steam or collection of video streams that has identified visual patterns that could indicate a tank, but the identification is uncertain. The second stream 404 may be a similar sequence of sb-frames from an acoustic sensor or set of sensors that also contains a set of partially recognized sounds, some of which might indicate a tank, but which also could indicate a tractor into which an enterprising farmer may have inserted a tank motor.

The resulting sb-frame expression 406 may produce some semantic statements that better confirm it is a tank, or it may produce information that can be used by another wreathing process with the original video streams to determine whether the original image patterns could also (or even better) be characterized as a custom farm vehicle.

The elements on the right hand side will always have an identity that a user will be able to interpret. The user would have the original videos, for instance to look at. The user would have the sb-frames, which in the case of videos will be selected objects or patterns across frames. The user would have sb-frame expressions that constitute right hand side phrases that also can be interpreted. They may be statements that relate a temporal history of a pattern from one frame to another, but these can be any logical statement up to and including statements of what causes what. It is a desirable feature of the invention that right hand side objects can be human-interpretable and the logic auditable.

Left hand side objects which have been described as categories or control groups are highly abstract mathematical objects not directly interpretable except through observation of their effect on right hand side objects. They can be conceptually thought of as a representation of "the situation which makes the right hand side true." In other words, Control groups are abstract objects that are defined by the results when applied as a group theoretic product. They are correlated one to one, or a collection to one, situation of interest. Control groups can be stored as a data structure based on its properties as a directed graph, using one of several graph data structures common in the art for such purpose.

The resulting transformed sb-frame expression 406 consists of transformed sb-frames which may (or may not) highlight patterns of interest. These sb-frame expressions 406 are fed back into the system to be evaluated by other control groups 401. Over a very few cycles of 401/402, refined identification of objects, situations or conditions of interest across all streams will have occurred and the iterated sb-frame expressions 406 are sent to a conventional reasoning system.

Figure 5:
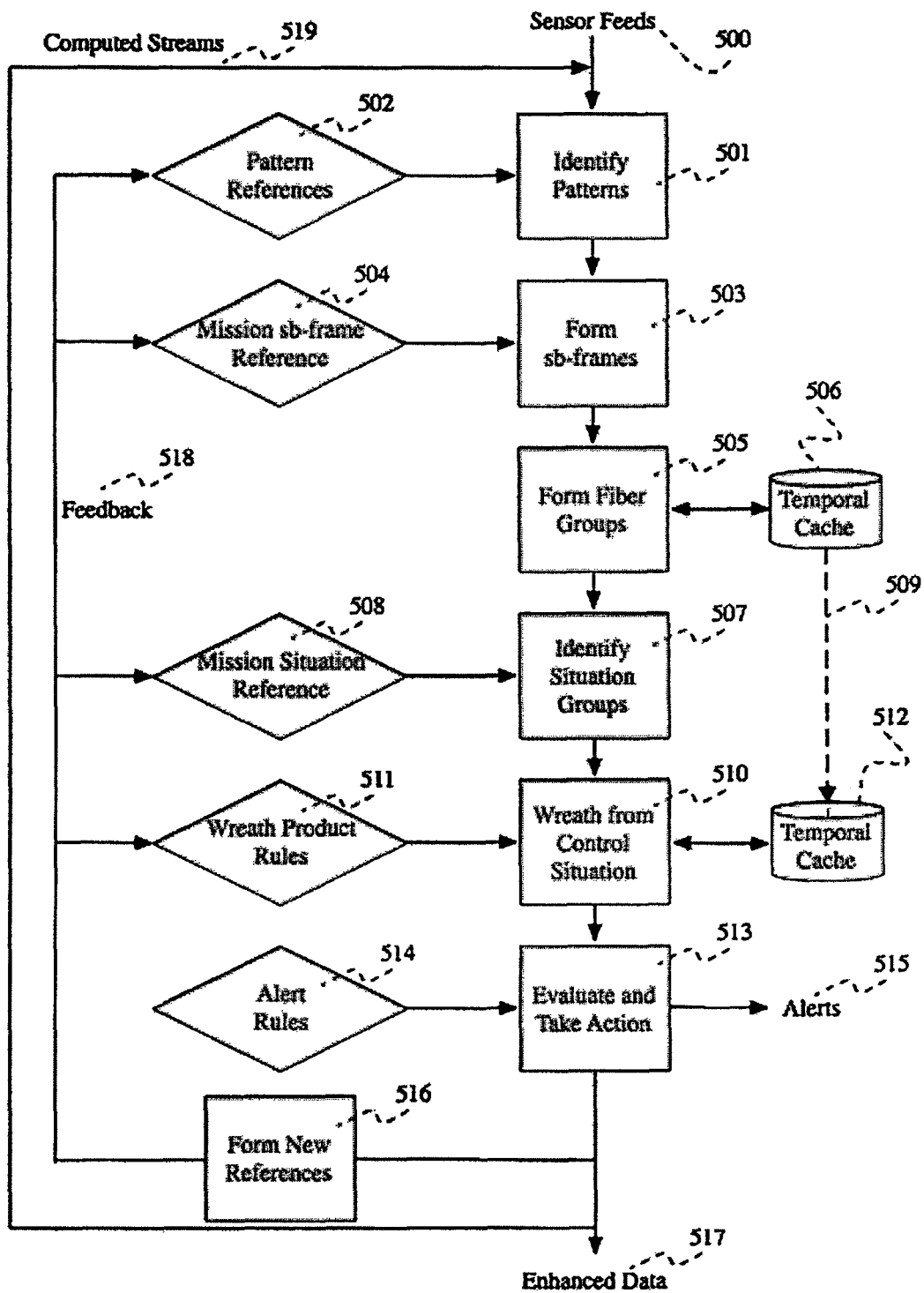
FIG. 5 is a flowchart illustrating information flow management and evaluation in accordance with an embodiment.

The group theoretic implementation can be mathematically factored from a Bayesian or hidden Markov model, and the generalization as Kalman filters. All these are common inferential algorithms for linear dynamical systems. Therefore, existing algorithms can be incorporated into the expanded vocabulary FIG. 5 is a flow chart illustrating an instance of the process performed by an embodiment, using the example of an intelligence community or data mining sensor system.

Sensor feeds 500 enter the system in their native form. These may be streams, for example video, SAR, acoustic or other sensors, document streams from web pages, email, instant messaging, scanned documents and other sources, either as queried data or delivered stream. These may be extremely raw data, or already enriched by some external process. They may be well normalized sources, for example internet spider feeds with well formed XML, or less standardized such as full motion video using several formats. The sensor feeds 500 may come from hardwired sensors connected to capture hardware (cameras, for example), or may be delivered via the internet or other communications methods. Hardware implementations of the system include a receiver for receiving the sensor feeds, which may be any known communications receiver.

From these sources 500, certain patterns of interest are recognized using pattern recognizers in step 501, possibly using existing tools or methods known in the art. For example, video feeds may have patterns, edges and movement recognized, if they have characteristics noted in the stored pattern references 502.

Text documents may have words, phrases or n-grams identified. Spoken language sources may have these also, plus inflection and rhythm patterns. SAR sources may have three dimensional forms, texture patterns and item occurrence counts. Satellite imagery could contain spectral profiles that could be used to identify emissions or undersea activity. Large scale signal intelligence monitors may have massive characterizations of usage patterns.

Any of the sources may be enriched with metadata that enhances the pattern identification. For example, SAR source information may come with atmospheric data to allow for optical correction.

Some sources may come encrypted, in which case the "patterns" are intermediate or end use decryption artifacts. Some sources could be highly corrupt or deliberately spoofed and some patterns of interest would be sortable.

These patterns can be identified by computer processors of the system, which may be specialized processors or general processors executing specialized software programs embodied on a non-transitory computer-readable medium.

Pattern References 502 are stored on a computer storage medium, can be updated, and at step 501 can be utilized by object and/or pattern recognition tools or methods. For example, if pattern recognizers for surveillance video consistently but inconclusively detect possible tanks, and if collaborative analysis from the invention confirms that consideration of additional or new features can improve that local process by updating the reference, then the pattern references 502 can be modified, perhaps in real time, by information generated by 516, as described below.

The patterns identified in step 501 may be in a form produced by legacy methods (for example in video, existing h.264 b-frame patterns), or may conform to standards for specific disciplines, missions and media types. Such standards are common in the intelligence community. An example would be patterns indicating objects deposited by humans in the vicinity of public buildings, or certain characteristic key words in a voice message.

At step 503, the patterns are converted into sb-frames. The process is similar to that of step 501, although in step 501 patterns are specific to the media type, for example video patterns. In step 503, the higher level patterns are specific to the purpose of the system and have semantic association—they are not necessarily specific to the media type.

For example, the output of 501 from video streams might be general to war zones, birthday videos and joke postings on the web. Patterns and edges would be pulled and objects identified.

On the other hand, the system may be tuned to a specific purpose, for example terrorist threat identification. So, many of the patterns from 501 will be passed through as apparently unimportant. Others may be determined at this stage to be potentially important. For example a Naval sonar receiver may be concerned only with man-made objects that fit a certain profile.

In addition to this filtering and additional recognition, step 503 transforms the media-specific results of 501, to semantically enhanced results that have significance in the mission of the system. For example, 501 may be tuned to identify vehicles of a specific type, with greater weight given to tanks, but the data structures from 501 are filtered and enhanced from the native data type. In the video case, they will be a mathematical description associated with the sequential raster images.

Step 503 involves conversion of the patterns identified at step 501 to semantically neutral facts. A common method would be to have a humanly-interpretable ontology that can be associated with the data structure from 501. For example, there may be an ontological element with the semantics "possible tank" or even "tank moving threateningly in the direction of a valued asset with the probability of (a certain dependent function)." These semantics form the basis of a new representation of the data so that they can later be assembled into fact statements structured by logic.

For example, the system ontology may be of the following type: human-interpretable facts that can form logical structures. But the ontologies can also be cleverly constructed to be between the types associated with the source data and the type of reasoning ideal for the system. As already mentioned, this can be as abstract as a higher dimensional Bayesian system (where the logic has probabilistic—or other abstract—dependency) or Markov chaining (where the items of the sb-frame have some more abstract identity) or any synthesis.

Example sb-frames may be as simple as a logical wrapper around a packaged set of data-specific primitives, effectively representing: "the b-frame contained herein has the following potential importance—expressed as a semantic fact from the coherent ontology—based on the sorts of situations the system is looking for and the relative depth of analysis we set for the system."

A list of the sb-frame types is purely dependent on the mission of the system, the level of human auditability desired, the form of logic employed, the types of information ingested and the types of product or messages desired. In the example associated with the intelligence community, they might be combat theater-specific and conform to strict, coherent ontologies used for downstream analysis and intelligence reports.

In the example associated with the virtual enterprise, the semantics and logic may be from several inter-related ontologies. One may have to do with actual manufacturing, assembly and delivery processes associated with the laws and logic of physics. Another may be concerned with metrics associated with value, costs, profit and incentives and be based in arithmetic. A third may be semantics and logic of business practices and management science that bridges these two.

In either case, a simple representation can be formed using knowledge representation techniques known in the art, and/or adaptations derived from the semantic connectivity and distance from graphs in the reference ontology.

The sb-frames are formed from an ontological reference 504 that is stored on a computer storage medium. Each pattern for each media signature has a characteristic sb-frame, depending on the logic and purpose of the system. As with 502, this reference is updatable on the fly.

An example entry in 504 would be a pair of related data structures. One of these data structures would be media-specific patterns as managed by 501, for example video b-frame patterns like those characteristic of heavy vehicles. Paired with it would be a semantic statement which can be of many forms according to the logic. A simple example is "heavy vehicle exists" with appropriate ontological linkages to resolve each term and the constructed grammar. In this example case, the function of 503 is to take the data structure from 501 which is a mathematical object associated with a set of raster images and assign it to or wrap it in a logical object that is associated with reasoning and reporting.

The next step 505 involves the formation of fiber groups. Fiber groups are sequences of sb-frames related by connectives. Connectives can be as simple as "while" and "and then." In this case, assuming that the feed from 503 does not yet have feedback 518, then the feed can be purely from one stream or one media type. As an example, a fiber group (as illustrated in FIG. 4 as stream 404 composed of sb-frames 403) could be stated as "in video frame 41-48 of stream V we found a pattern (b-frame type A4F3) that indicates a heavy vehicle, possibly a tank" "while" "in video frame 39-44 of stream IV we found a pattern (b-frame type A3E3) that indicates a vehicle" "and then" "in video frames 54-92 of stream IV we found a pattern (b-frame type A3E3) that indicates a tracked vehicle has passed."

In the above "in video frame 41-48 of stream V we found a pattern (b-frame type A4F3) that indicates a heavy vehicle, possibly a tank" is representative of the semantic wrapper of an sb-frame. "And then" is a logical connector. A wide variety of logical connectors can be used, but in this example embodiment the vocabulary is sparse to allow for speed. The entire logical assembly of connected sb-frames has structure that in 505 is extracted to form a group which will be used as a fiber group.

This requires a user-tailorable number of sb-frames to be stored in a cache 506 because some of the ordering takes account of sequence, for example the "and then" connective. The user can adjust this; generally the larger the fiber group, the deeper the analysis will be, but the more of a delay will be introduced in the process of conveying in the real-time stream to the user at step 517.

Note, the example above assumes no feedback. Feedback can be used to present computed intermediate results from the system across many streams and many media types. It presents these as if they were streams from a very smart sensor providing additional information to be interpreted.

The illustrative embodiment takes advantage of three representations in different contexts. The incoming, initial representation is a mathematical object consistent with the nature of the tools of pattern recognition processors. These we have termed here b-frames. These get associated with logic and semantics so that certain structures can be formed and delivered to be used for human-interpretable alerts and more intense downstream analysis. We have termed this combined structure an sb-frame. At this step 505 we further add a group representation on top of the sb-frame assemblies so that an efficient two-sorted reasoning process can be applied. The system exposes each of these three representations when needed.

At step 507, relevant situation groups are identified from the fiber groups formed in step 505. Mission situation reference 508 is a computer storage unit that contains situations of interest to the system. This vocabulary is not limited by the design of the system but in the embodiment will be constrained by the depth of analysis desired versus the speed of conclusions needed. Continuing the example embodiment for the intelligence community, situations of interest would include the situation of "a threat to a valued asset by aggressive weapons."

The situations of interest data structures would be initially formed by ontological association. An embodiment would build them from case based reasoning, evolved from the kinds of incidents that had produced this threat in the past. Because the data structures can be evolved, they may not be precise or discretely expressible in all instances. The advantage of expressing these situations as a group is that the group captures the structure of the kinds of situation dynamics without having to describe an exhaustive list of logical conditions.

Unexpected threats (as opposed to stored patterns of known threats) can therefore be identified by these structured, situational dynamics. As these are left hand side objects, their expression will not be human interpretable. As with the other references in the system (pattern references 502 and ontological references 504 as described so far), this reference can "learn" in real time.

For each of these fiber group characterizations from step 505, there is a subset of the possible control groups that will apply. At step 507, the system identifies the subset of control groups using the mission situation reference 508 that can dynamically change as the mission or analytical situation changes.

An example of how a situation reference can change: suppose that in one collection of information streams, the practice is to consider a non-allied tank advancing on a valued asset as a threat. Mission situation reference 508 contains the control group abstracted from a general collection of defined facts and events that support that group. The control group is not exhaustively defined because it contains the structure of the situation that can apply to many instances, some of which are presumed unknown.

But later in the system when additional information is folded into the increasingly collaborative synthesis, it becomes known from a human intelligence source that local friendly forces have captured enemy tanks and are rushing to aid allied forces. The previously stored situation contains structure that would have supported many previously unknown sb-frame conditions, but not this one.

At step 516 new combinations of conditions are recognized, based on a refined notion of threat situations and sends relevant information to mission situation reference 508 that results in a restructured set of control groups, now adequately covering the learned new situation and a greater scope of others that have not yet been encountered.

In this way, the system adaptively learns. In embodiments of the invention, the system learns more general situations that can include conditions yet unencountered.

At step 507, the system prepares a package of a fiber group with the associated candidate control groups, determined based on an evaluation of the situation against the control group vocabulary (i.e., a collection of patterns that abstractly represent situations of interest and that represent those situations when applied to the fiber groups).

At step 510, the system performs wreath products. At this step, the system receives a single control group and one or more fiber groups. Multiple wreath product steps can occur in some embodiments before being passed on. Alternatively or in addition, parallel wreath products can be applied to the same set of fiber groups, using different control groups.

A simple example is the presentation of a single fiber group from a single information stream. A simple fiber group is presented, perhaps as already mentioned with the detection of a possible tank. The computation of the wreath product in this case produces a sequence of possible future states as right hand side logical statements. If enough of those match a threatening situation, then the system, at step 513, will identify the threat and take appropriate action, such as producing alerts 515.

A different type of package can be assembled from a single control group and many fiber groups. In this case, each fiber group is a component in the assembly of a larger fiber group. The components are connected by "and also" connectives in the example. The purpose of this is to use situated reasoning to combine information from several sensor streams of different types. An example may have two fiber groups: one is the set of possible tank features from a video stream and the second being the set of sb-frames extracted from a collection of incoming human intelligence emails indicating the set of example facts about friendly forces in captured tanks.

Application of the wreath product in this case combines the "facts" from the component sb-frame constructed fiber groups to produce a synthesized series of facts as a situated deduction. In this manner, the system produces a newly situated collection of facts with different conclusion: "there are tanks advancing" "and" "they are controlled by friendly forces" "so" "the intent is not threatening" "but" "these forces are known to do unexpectedly stupid things" "moreover" "doing what they are doing now is stupid" "therefore" "we have a different order of threatening situation."

These sorts of semantic permutations using group theoretic semidirect products are possible because of the care that has been taken to carefully order situational semantics and incoming feature semantics.

It should be noted that while this example embodiment uses wreath products, a broad class of permutation-creating semidirect products can be used, extending to functors and morphisms over categories.

At step 510, the system performs the wreath products, producing transformed collections of sb-frames to be conveyed and passed on to step 513. Note that the information that results is structured according to the same rules as the information that enters step 507: human-readable sb-frame statements that can be reported to a user (perhaps with some slight translation) with auditable logic and all the relevant sensor artifacts. Alternatively, the resulting sb-frame structures maintain their ability to be seen and processed as fiber groups in collaborative feedback cycles.

Under normal conditions, the system needs no external information at step 510. However, there are certain conditions under which external constraints apply to the wreath products. For example, an intelligence analyst may have been alerted by the first round of results from the single video stream and have manually adjusted the constraints of the system to perform more tight analysis, involve more situations, trust certain information over others, or combine sb-frames from streams that were previously unprogrammed.

These conditions are provided by a wreath product rules reference 511, automatically or with external oversight as indicated. The wreath product rules reference 511 may be stored on a computer storage medium.

The rules reference 511 may employ a recent history in applying the rules. For example, in evaluating causal dynamics the system may build a causal sequence and therefore need to temporarily store steps from previous results as fiber groups.

The recent history is captured in a cache 512 which can be fed both from step 510 and the previous cache 506 which could have shared entries.

At step 513, the system performs a lightweight evaluation of the resulting fiber group. As described, such a group may report deduced information from many sb-frames from many streams.

At step 513, the streams of computed sb-frames are sent as transformed fiber groups to one or more locations.

A primary purpose of the system is to deliver enhanced sensor streams in near real time to more heavyweight and existing analytical systems.

A secondary purpose is to send alerts in near real time from threats or significant profiles that the invention can identify. The rules for what threat profiles and alert destinations apply are stored in step 514. If a fiber group is determined by the rules to qualify for an alert, then the alert 515 is sent to the specified destinations.

There are two learning mechanisms of the system. One is straightforward. If the system, at step 513, determines that the computed fiber group has enhanced information, then it is fed back into the system so that its component sb-frames can be seen as streams as if they came from an intelligent sensor, which is essentially the case. These streams 519 may have complete interpretations, but in the usual case they have partial information that may or may not be a constituent of an sb-frame sequence of interest.

A second learning mechanism is more subtle and takes advantage of the adaptive two-sorted logic. Fiber groups can become control groups and inform the left hand side introspective logic that is applied. At step 516 the fiber groups are converted to closed groups so that they can be added via feedback 518 to references 502, 504, 508, 511, each of which may incrementally ingest it to use in its local group operations.

While the system of FIG. 5 works with continuous streams accepted by 500, it also cycles. The streams are processed into data structures according to the rules in 502 and 504 and the groups are processed according to the size of those data structures in a discrete process.

A simple example of data processing according to the embodiment of FIG. 5 is now provided for illustrative purposes, though it should be recognized that the embodiment of FIG. 5 is generally configured to handle much more complex processes in accordance with the description above. In this example, the stream data received from sensor feeds 500 is video and audio data from a geographic area. The data is processed for patterns at step 501. For example, patterns that are generally associated with the shape of a tank in video and the sound of tank tracks and a motor may be detected based on known video and sound signatures of these items stored in pattern references 502. Existing proprietary systems may be used to make these pattern identifications.

Once patterns are identified at step 501 in the stream data, the information is passed to step 503, where sb-frames are formed. The sb-frames are a collection of facts about the data that also incorporate semantic data using a language that is not specific to the media type. For example, an sb-frame may incorporate the pattern of video data and may indicate: "this is a collection of man-made items" "that is" "possibly a tank."

The audio patterns of a tank track and a motor may be formed into a sb-frame that indicates: "a possible tank track sound" "and" "a motor" "that indicate" "probably a tank." Note that this is stronger than an sb-frame for a motor alone, which may only indicate: "a motor" "that indicates" "a vehicle" "or" "possibly a tank." Since the data is generalized beyond the specific media type, it can be collected together across media types.

After media independent sb-frames are formed at step 503, the data is passed to step 505, where fiber groups may be formed. Fiber groups are sequences of sb-frames related by connectives. For example, the two sb-frames above may be connected, using information from timestamps, to form the statement: ["this is a collection of man-made items" "that is" "possibly a tank"] "while" ["a possible tank track sound" "and" "a motor" "that indicate" "probably a tank."] This is a fiber group collecting sb-frames from streams of different media types.

Step 507 involves the identification of situations of interest. In this example, a situation of interest may be represented by a control group that describes "a tank" or "a moving tank." The control group may also be more general: "a threat by heavy weapons." At this step, sb-frames that may be related to the situation of interest are formed together with the control groups. In this example, the fiber group ["this is a collection of man-made items" "that is" "possibly a tank"] "while" ["a possible tank track sound" "and" "a motor" "that indicate" "probably a tank"] is related to the control group ["a threat by heavy weapons"] because it involves a possible tank.

At step 510, the sb-frames are wreathed together with the control groups to produce situated deductions. In this case, the various data indicates a high probably of a tank. This is true because there is both the sound of a tank (indicating "probably a tank") along with a collection of items (indicating "possibly a tank") at the same time ("while"). In an instance where the control group is "a threat by heavy weapons" this is highly relevant. In this case, the wreath product would be "there is probably a tank" "and" "the tank is moving" "so" "there is a threat by heavy weapons." This product would likely produce an alert 515, and may be also passed along, as enhanced data 517 to another device that could use the data.

The wreath product could be more complex. For example, there may be additional data from other fiber groups (for example, fiber groups formed from email data) that indicates "allied troops are in the area" or even "allied tanks are expected to move through the area." In this case, a wreath product may be the following situated deduction: "there is probably a tank" "and" "the tank is moving" "but" "allied tanks are moving through the area" "so" "there is likely no threat." This example illustrates how the abstraction to sb-frame data structures and the relation through two-sorted logic facilitates the use of data across various types of data streams to form situated deductions.

Figure 6:
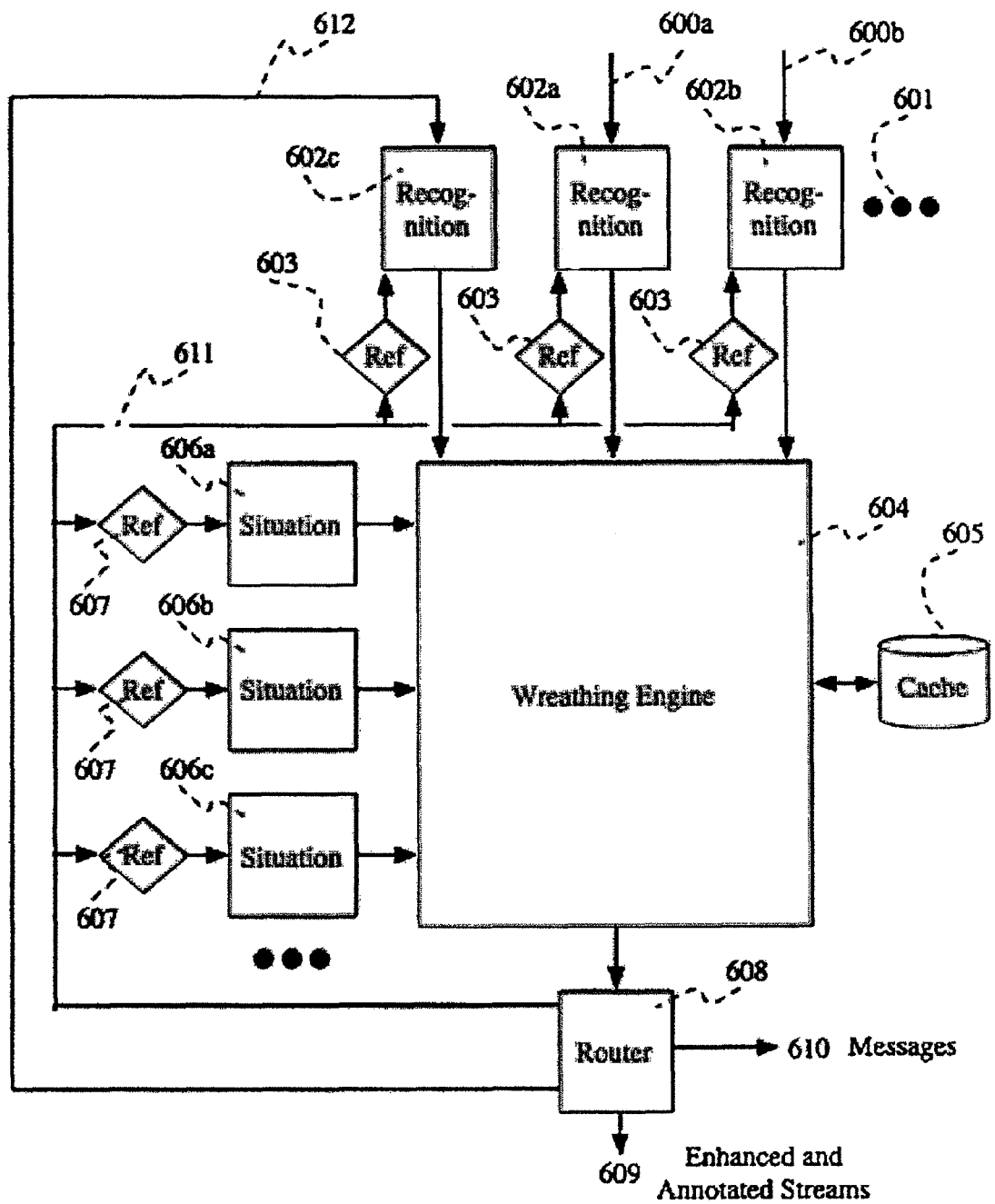
FIG. 6 illustrates a structure for managing and evaluation of a flow of information.

FIG. 6 illustrates a representative architecture, which is described below with reference to the intelligence sensor embodiment. The architecture is described below in logical units, which may be embodied on one or more computers, which may include one or more multiprocessor computer systems. Functional aspects of the architecture may be implemented as a computer program on a non-transitory computer readable medium.

Multiple streams 600a, 600b are received by the system. The streams 600a, 600b may range from different media types: video, sound, synthetic aperture radar, acoustic, and so on with other conventional streams and their variants. Inputs 600 can include discrete flows: a sequence of messages or web pages, for example as returned by a crawler. Inputs can be any type of serialized discrete or continuous information. The system may receive streams 600a, 600b directly from sensors connected to the system, or may receive streams 600a, 600b via a communications device.

An important feature of the architecture is that it scales well at massive numbers and variety of such inputs. Element 601 indicates massive numbers of inputs.

Recognition units 602 are specially designed, one for each media type and recognition need. Recognition units 602 perform the functions of steps 501 and 503 of FIG. 5. That is, they perform the pattern recognition or filtering tasks on the streams and deliver sb-frames. Some of these may be adapted from existing analytical code or products that analyze streams to deliver data structures coupling data to semantic representations. The example architecture presumes that many legacy modules can be incorporated into the system. An example would be the first half of a conventional object recognition engine, designed to detect certain objects or behaviors from single video feeds. In those cases, the foundation patterns are literally based on b-frames, similar to those used in compression schemes such as h-264.

FIG. 6 shows each of these pattern detection engines in two elements. Recognition units 602 detect and format the patterns of interest; recognition unit references 603 are dynamically updatable references which specify the patterns of interest and the sb-frame ontologies and protocols used in generating the sb-representation. The recognition unit references 603 may be stored on a computer storage medium. The result of recognition units 602 as processed and passed to the wreathing engine 604 are a sequence of sb-frames, for example formatted in data structures of the sb-frames 403 of FIG. 4. These sb-frame sequences are processed and stored as fiber groups.

The sequence of sb-frames from each recognition unit 602 when collected is represented in data structures using the streams 404 of FIG. 4. The length of the sequence is stored in recognition unit references 603 and is user-tailorable; a longer sequence results in longer processing cycles and more detailed enrichment, but usually at the cost of increased delays in the real time streams.

Meanwhile, situation control units 606 present control groups of different types. There can be a large number of situation control units 606 as shown. Each one of these manages a class of situations of interest. As with recognition units 602, these situation control units 606 are paired with references 607 that are dynamically updatable, modifying the situations and the way they present as control groups.

As discussed above in reference to FIG. 5, the information coming from recognition units 602 as fiber groups can be represented with user interpretable semantics, wrapping feature patterns (b-frames, for example) with logical statements pulled from the reference.

In contrast, the control groups might have reference ontologies that are human navigable, but the control groups themselves are represented as abstract mathematical objects.

The wreathing engine 604 forms larger fiber groups of the fiber groups from recognition units 602 as previously illustrated in FIG. 4, where multiple fiber groups from recognition units 602 are combined.

This architecture elaborates the schematic flow chart of FIG. 4 in supporting simultaneous feeds and simultaneous situations. The effect is to allow for sb-frames within each stream to be merged with sb-frames across all streams. One advantage of the invention in this embodiment is that it allows for this sort of sb-frame relationship across many streams where current methods allow early pattern recognition in one stream only, using extremely localized methods.

Situation control units 606 can all be constructed from the same basic code. This is in contrast to recognition units 602 that are each highly specialized and may be from repurposed legacy code. Because situation control units 606 perform the same functions using the same basic code, their discrimination into groups 606a, 606b and so on can change from time to time as determined by an external analyst changing the situations of interest, a system engineer (or collection of automated agents) that refactors the situation control units 606 for computational efficiencies, or they are refactored based on rules triggered by feedback 611.

The wreathing engine 604 filters selected combinations of control and fiber groups as described with reference to the operation of step 507 in FIG. 5. The control groups representing situations of interest are then wreathed into candidate fiber groups constructed across the streams. A storage unit 605 stores the number of steps determined to be the "chunk" (i.e., number of features included together) size. A control could optionally be included to dynamically adjust this chunking size; should the system determine that a particularly high value set of situations is being identified, then a message may be sent to storage unit 605 temporarily increasing the chunk size, effectively zooming out to give a bigger picture, at the cost of delays in delivering the processed stream 609.

Many wreathed streams result. The wreathing engine 604 filters these for those that are enhanced past an adjustable threshold. It then presents the original streams, their enhancement and the new streams of interest that the wreathing engine 604 produces. These are passed to router 608 which performs the functions of steps 513 and 516 of FIG. 5. Just as in FIG. 5, the results are: processed streams 609 for storage and analysis by other means, alert messages 610, learning feedback 611, and new streams that get recombined with the new chunks from recognition units 602.

In the virtual enterprise management system example, situation control units 606 could be, for example, situations representing desirable enterprise and product features. Recognition units 602 could be, for example, formatted process models as the fiber groups and their characterizing events as the item or service is transformed as the fibers.

In the intelligence community example, inputs 600 could be, for example, feeds from different streaming sensors and discrete datapools. Recognition units 602 could be, for example, feature extractors (sometimes called "recognizers" in the art), including code to wrap the features with semantics generally common to the entire system but describing the specific features recognized from the feeds. These potentially thousands of feeds enter the wreathing engine 604.

References 607 contain linked ontological patterns that characterize situations of interest to the intelligence analyst. The system could work with only one of these, but several are beneficial. Situation control units 606 produce the mathematical objects that characterize these ontological situations to be used as control groups. In practice, the wreathing engine combines the normalized facts from the world (provided by recognition units 602), extracts synthesized statements that "support" the situations of interest and create enriched information for the system to reuse and to be used by downstream analysis.

The functions are broken into four main groups in this example architecture: Inputs 600, inputs 601, recognition units 602 and recognition unit references 603 operate in a probabilistic paradigm. That is, the representations presented in the incoming information are quickly recognized using matching techniques in the art. While the representations can be parametric, the identification is usually by probabilistic processes.

Elements 604, 605, 606 and 607 operate in a group theoretic paradigm, leveraging geometries and symmetries via wreath products. This second representation space allows for computation-friendly reach across the entire system for what amounts to pattern matching at the meta-level, here described as the left hand side (situation) "logic."

The router 608 and the messages it produces operate in the logical world (mathematically set-theoretic) to which it ordinarily will interface and using the logic and semantics (in the example embodiment) shared with the natural language and reasoning tools of humans.

Thus, three different programming paradigms are integrated in this system, each used to the advantage it allows. One of skill in the art would recognize that all or part of the recognition units 602 and recognition unit references 603 can be located remotely from one another, and could be located with (or even built into) the sensors.

A specific computer software embodiment is described with reference to FIG. 7. This embodiment may use, for example, the IBM InfoSphere Streams™ infrastructure and the Stream Processing Application Declarative Engine (SPADE) language that has been developed for it. Alternative complex event processing frameworks would follow a similar implementation strategy. A specially designed processor system is desirable for some uses; although the invention supports efficient scalability, it can take advantage of certain architectures designed to support massive scale. U.S. application Ser. No. 12/798,487 teaches a distributed, web-based multiprocessor system for the category-theoretic embodiment.

The IBM InfoSphere Streams™ environment is a programming framework using an approach called "complex event processing." A goal is to accommodate streams of data, including large numbers of streams with complex internal structure and data typing. The environment is intended to grow to be introspective and capable of reassigning tasks, re-allocating resources in a loosely federated environment.

The IBM InfoSphere Streams™ environment can be described as supporting three essential functions: messaging, coordinated rendezvous and type management.

Messaging is a matter of moving streams in a well managed way and handling metadata that may be generated from and attached to locations in and across the streams. The movement of information generally shown by arrows in FIGS. 5 and 6 are indicative of this function, including step 513 and router 608.

Coordinated rendezvous is the task of delivering relevant information to locations for processing, usually by an externally programmed node. These locations are called "sinks." As the relevancy of streams varies, the grouping of those streams with coordinated timing and the synchronous delivery of metadata is demanding. The rectangular elements in FIG. 6 may represent nodes supported by code programmed outside the system and delivered by through an application programming interface (API). Among those nodes, the wreathing engine 604 would be a sink where many newly formatted streams and relevant associated metadata are sent with precise timing.

The ability to manage many data types and especially data types that span discrete and continuous data is powerful. Without this ability to recognize and transform types within the system, the other two basic functions cannot be supported.

These three functions are supported by one-way pipes (or data paths) that convey streams and messages, operators that transform streams using a functional paradigm, and adapters that are functions optimized for type operations.

In an embodiment, each of the recognition units 602 and the situation units 606 are separate, independent, computer processor units, and the references 603, 607 are stored on computer readable mediums accessible by the computer processor units. Recognition units 602 and situation units 606 may be specialized computer processor units, each designed to process a particular type of data. Examples in the case of images are software libraries that run on Intel microprocessors such as the Intel Integrated Performance Primitives™ libraries, dedicated commercial hardware such as On2/Google Technologies' Flix Engine™ or integrated systems such as Neurotechnology's SentiSight™. In the case of SAR, the technology may be the MIT Lincoln Laboratory HPCS Scalable Synthetic Compact Application on Broadband Cell Architecture chips, or the Raytheon ASARS 2™ device. Speech and natural language may be handled by technology supplied by Nuance™ or KurWeil™ on specially designed hardware. All of the functions can be supported either by custom digital signal processors (DSP) such as supplied by Texas Instruments™ or Field Programmable Gate Arrays (FPGA) as supplied by (for example) Xilinx™. Industrial sensor recognition processors are often designed around custom FPGAs by plant integrators, such as Bechtel™.

The units 602 and 606 may communicate with one another via any communications protocol, including network protocols. Incoming streams 600 may be received as streams of data by the recognition units 602 over a computer network, which may be the Internet, and intranet, a private network, or any other type of network. The engine 604 may be a separate computer processor unit connected to recognition units 602 via a communications protocol, such as networking communication protocols, and also connected to cache 605, which may be stored on a computer readable medium.

In another embodiment, each of the recognition units 602, the situation units 606, and the engine 604 may be computer software units stored on a computer readable medium of a computer processor system, which may be a multiprocessor system, such as a supercomputer composed of Broadband Cells, or a mainframe such as an IBM System z Series™. The computer processor system may receive streams 600 from sensors connected to or in communication with the computer processor system by a communications protocol.

Figure 7:
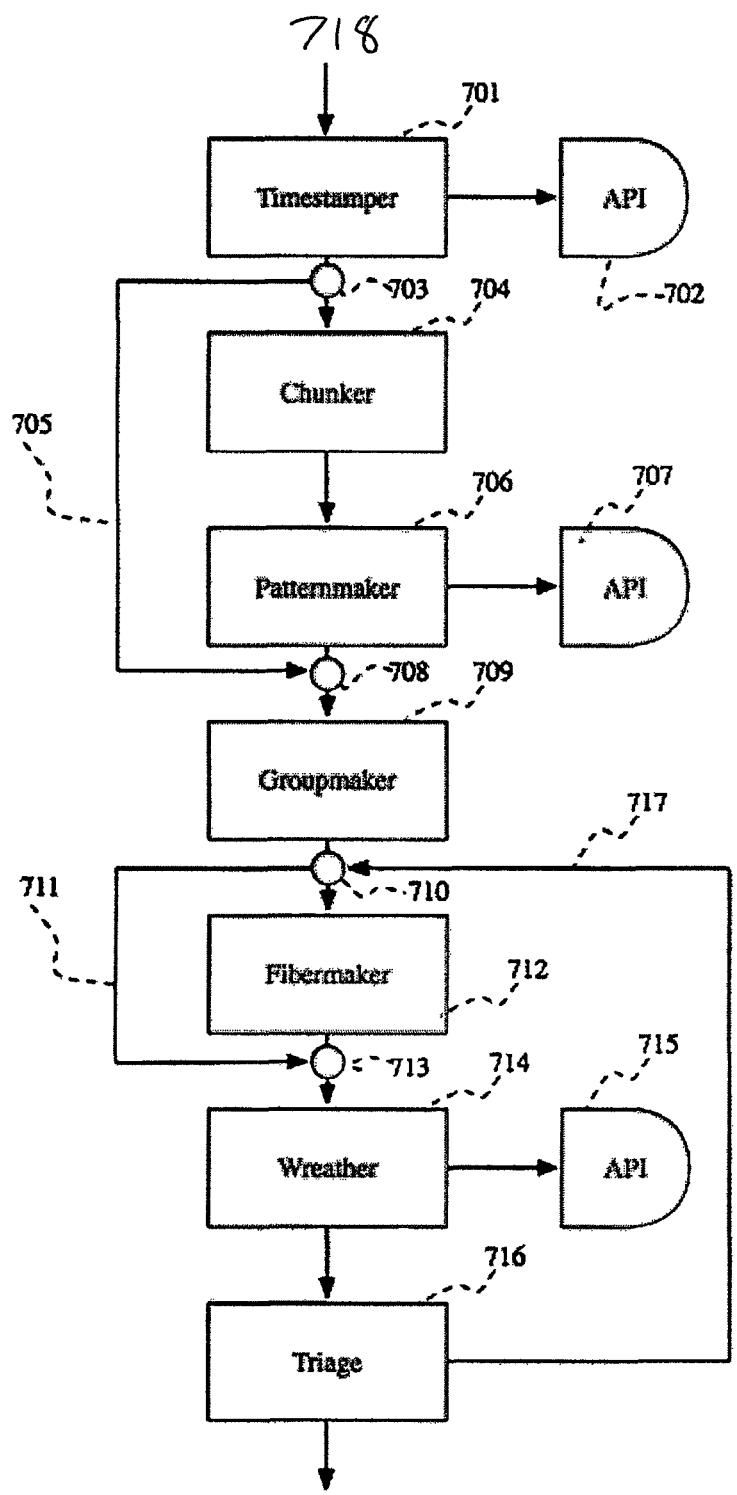
FIG. 7 is a flowchart illustrating flow of a stream.

FIG. 7 illustrates an example flow schematic. The flow moves from top (701) to bottom (716).

This example embodiment accepts streams 718, which may be, for example, process flows from candidate partners in a virtual enterprise. The processes in this example are characterized by continuous process events. Many such candidate process combinations exist. The system in this example also accepts streams that represent business intelligence "sensors" that in this case are collections of "value features:" a standard vocabulary of primitive needs of the marketplace, some functional and others cultural. In practice, these sensors can be a combination of information contributed by the firms in question with information gathered from the environment.

The purpose of the system is to identify candidate products and services while simultaneously identifying combinations of processes to assemble a "virtual enterprise." The system uses these streams to assemble the product and enterprise simultaneously. It also operates the enterprise in a state of continual improvement and re-invention.

At step 701, the incoming streams 718 are processed. If not already well formed, the streams are normalized and the data and metadata is characterized, for example, using predictive model markup language. Such a standard is not required for work within the system, but enhances the general applicability of the results.

Some of the work at step 701 may be simple, but the streaming feeds may benefit from more advanced processing from systems such as described in U.S. application Ser. No. 12/924,999 filed on 5 Nov. 2010. Step 701 may utilize an associated API 702 to interface with such a system, one that normalizes metadata for processing.

The many now normalized streams are collected in a sink 703 (a "sink" being a term of art in IBM InfoSphere Streams™) that separates the process streams from the feature streams. In a normal case, they will come mixed together; for example, the people and firms that who make successful products often know what customers desire and plan their processes accordingly.

Streams that are identified as feature streams are routed past steps 704 and 706 by 705 and are collected in sink 708.

Process streams are handled in step 704. Step 704 employs built-in functor and aggregate operators to form chunks from the processes. These chunks represent process sequences and/or process cycles. An example may be one shift's run through a paint cell. At this stage, it makes sense to chunk some component operations together because it may be physically impossible to perform them partially. For example, chunking a process at an entire eight hour shift may make sense because the end of the shift is when you purge the paint cell, possibly changing colors.

At step 706, the system analyzes the chunks for process patterns that allow collaboration or connection. There may be many subsequent processes that can follow a given process, but it is generally a limited set. Step 706 also includes finding the connective patterns where the post-conditions of one process flow sufficiently match the pre-conditions of another required process flow.

Sink 708 collects the streams. At step 709, the now normalized streams are processed into groups. Puntor and sort ("puntor" and "sort" being terms of art in IBM InfoSphere Streams™) operations are employed in this relatively mechanical task. After processing into groups, the streams are passed to sink 710.

At sink 710, feature groups 711 that include data from streams related to features are routed around step 712, to sink 713.

The process groups need to be additionally structured as fiber groups in step 712. This is a complex punctuation task, and requires a delay operator ("punctuation" and "delay" being terms of art in IBM InfoSphere Streams™) and an internal cache. Step 712 is essentially equivalent to step 505 in FIG. 5.

At step 714, wreath product operations are performed as described above in reference to the wreathing engine 604 of FIG. 6. This technique may require massive numbers of combinations to be evaluated. The group theoretic operations are, however, efficient and easily distributable into parallel threads. Accordingly, this task may be conducted by special optimized code and possibly dedicated hardware, for example Cell, CUDA or OpenCL systems. API 715 allows the Streams architecture to offload this task.

At step 716, unpromising products are discarded (or optionally archived), and the promising results are sent to a an external destination, such as a computer used by a user/engineer/manager. Partially promising results are processed as streams that may mature with repeated wreath product cycles. (This is functionally equivalent to steps 513 and 516 in the flow chart of FIG. 5).

A "promising result" may be, for example, where one conclusion indicates a threat (there is a tank), a second piecemeal conclusion nullifies the threat (it is operated by friendly forces), and a third conclusion reactivates and transforms the result (these friendlies make deadly errors).

In the virtual enterprise example, product features may be evaluated independently, the tentative results of one leading the analysis of the other. For instance, if product features are explored first followed by an interfolding of design processes, then a promising intermediate result is a collection of features for a forthcoming product that could lead to market success if only it could be manufactured within certain parameters. The partial result is returned via 717 for folding into the representations of manufacturing processes.

Another approach for the virtual enterprise example begins with the processes and then looks to features. In this example, the system looks a vast pool of ready, potential candidates, considering all their processes and the processes (by known learning processes) they can achieve, and then computes the successful products that can result from certain combinations.

In either case, successful results will be complete product and process designs including management processes for a successful product (or service) and the enterprise to support it.

Using similar techniques, mobile-phone streamed process events as SMS messages (perhaps in developing countries) can emulate this architecture.

Figure 8:
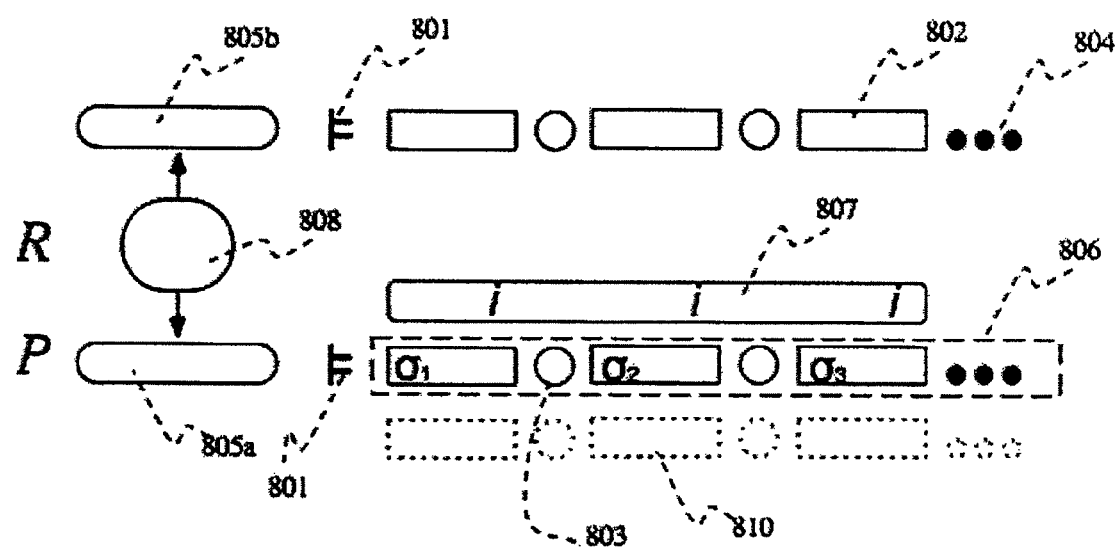
FIG. 8 illustrates situational theory data structures used by embodiments.

The situational theory data structures used by embodiments of the invention is illustrated in FIG. 8.

The standard unit of information is the infon 802, which when assembled in phrases by connectives 803 form statements as the right hand side 806 of our equations. Connectives can be logical connections like "and," "or," etc. Infons in the situation theoretic view have semantic interpretations and are designated by $v_x$.

Infons have internal structure $\ll Rp^-p^+; I \gg$ where R is a relation over two parameters $p^-$ and $p^+$ on which the relation works. In general logical terms, a relation might cover the concept "runs" with the two parameters being "who" and to "where." So we may have as an example infon:

$$\ll \text{Runs Mary home; I} \gg$$

which can be read: "Mary runs home. . . " (interpreted in the situation conveyed by I)

An infon has an element I, that colors the interpretation of the infon, based on its situation. The situation is represented on the left hand side 805. Infons inherit a situated interpretation, by a statement being registered to an ontology that has a similar structure.

The right hand side statement 806 on the bottom is interpreted in the context of the ontology at the top of the diagram. Which ontology is applicable, and how it maps into the statement is a matter of dynamics on the left hand side. This is managed by a collection of operations F between objects F. These objects F are the collected structure of the statement on the right hand side, that structure being determined by the interpretive paradigm supported by the system.

The parameter I in the infon statement is the fractional structure of F as distributed in each infon, and it represents the "coloring" of the semantics of the infon by the situation. In the most general case covered by the situational theory framework, the infons are assembled using logical or algebraic connectives.

In the virtual enterprise example, infons are process statements. The R is the process and the two variables, in this case $p^-$ and $p^+$ are the pre and post-conditions of the process. The connectives are "and-then" connectives with linear characteristics.)

The mathematics is best factored as a set of nested functions.

An infon $\sigma_1$ is a function over three elements:

$$F^2(Rp^-p^+)$$

Discrete types of functions are denoted by $F^x$. The basis for the topoiesis novelties is the engineering of this type system.

$F^2$ is a simple function with a closed type system and set-theoretic behavior. In our example, $p^-p^+$ are pre and post-conditions, such that P is itself a function over a set of events $e_n$ that must have or will have occurred.

$$F^1(e_n \ldots)$$

The statements on the right hand side can be expressed as a function. An intermediate function captures the effect on the interpretation of a partially situated infon by the previous infons plus the connective:

$$F_x^3(F_{x-1}{}^3 c F_x^2)$$

Where the set of connectives c are members of a closed set C with behavior axiomatically defined from $F^3$. It is partially situated because it only accommodates the situation of preceding facts.

A fully situated infon includes a more complete definition:

$$F_x^4(I_{x-1} I_{x+1} c_{x-1} c_{x+1} F_x^2)$$

This states that the infon has a situated interpretation when it considers the symbols and relations in it ($F_x^2$), the coloring of the infons before and after and the connectives with the infons before and after. This function ($F_x^2$) is a semantic bidirectional frame, sb-frame.

A preferred notation of the above is:

$$F_x^4(I^-I^+c^-c^+F_x^2)$$

Which is equivalent to:

$$F_x^4(I_x F_x^2)$$

In the general topoiesis, the type systems of $F^1$, $F^2$, $F^3$, $F^4$ are set-theoretic, coherent and governed by the same calculus.

The type system of $I_x$, is more complex, belonging to the second sort (in other words, the conceptual space of the left hand side). The dual of $F^4$ in this second conceptual space has I defined as a function over the infon, the reference ontology and the mapping function R from the structure P of the reference ontology to the structure P of the right hand side. P is:

$$F^5(F_x^4)$$

Where the type system of $F^5$ is category theoretic. Thus the collection of operations F among F are category theoretic relations where:

$$F^6(RF_-^5 F_+^5)$$

is a closed set, axiomatically defined. The similarity with $F^2$ is deliberate as the topoiesis system is designed to be able to define itself both in axiom ontologies and dual type systems.

Figure 9:
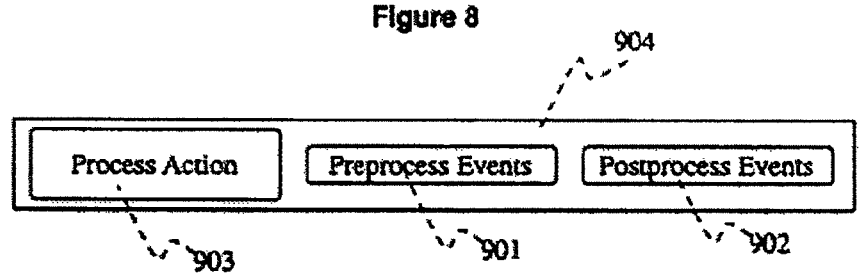
FIG. 9 shows example processes as infons.

FIGS. 9 through 13 illustrate these relationships diagrammatically. FIG. 9 shows a set 901 of process events that characterize the beginning of a process. Some are essential, others optional. All are from a closed set defined by a process ontology. There are several mature such ontologies.

Similarly, set 902 contains the set of post-process events. Process 903 is the process that can satisfy these pre and post conditions. A version of the invention can be fed exclusively by events, possibly even unassembled events. That version will have a process not described in FIGS. 5, 6 and 7 that collects them into sets 901 and 902, with the appropriate processes 903. In this way, that version of the invention will be more self-assembling than the instance described here.

The case of invoking an optional process of $F^1$ in addition to the necessary process of applying $F^2$ is indicated in step 501 of FIG. 5, part of recognition units 602 in FIG. 6 and part of step 704 in FIG. 7. Known set-theoretic algorithms are used.

The three sets 901, 902 and 903 constitute a process infon 904.

Figure 10:
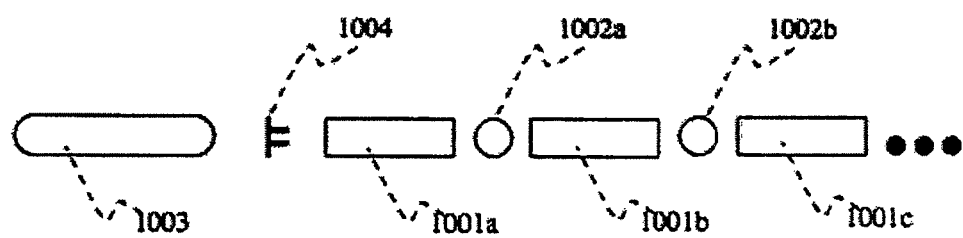
FIG. 10 shows an example process chain.

FIG. 10 shows a typical process chain. It consists of process infons 1001, connected by "and-then" connectives 1002. The infons and their constituents in this embodiment are great simplifications of the general topoiesis case. So too are the connectives. These are the simplest non-commutative linear logic. They ensure that processes occur in a specified order; also that the essential pre-conditions of a process infon match the essential post-conditions of a previous process infon.

There are as many process chains as there are permutations of such processes. The termination of the chaining is determined when a product value feature is accomplished. Element 1003 indicates the situation of this value feature. Suppose that the value feature is the drilling of a hole to support downstream assembly. The equation of FIG. 10 would then read: "the situation of creating this value of potential assembly" 1003 "is supported by" 1004 "the process of selecting the piece from a bin" 1001*a* "and then" 1002*a* "rotating the piece under the drill" 1001*b* "and then" 1002*b* "pressing the drill with bit number 6 on the piece" 1001*c* and so on.

The process of assembling these statements is indicated in part of step 503 in FIG. 5, part of recognition units 602 in FIG. 6 and part of step 704 in FIG. 7. It applies the processes of $F^3$. The processes are set theoretic.

Figure 11:
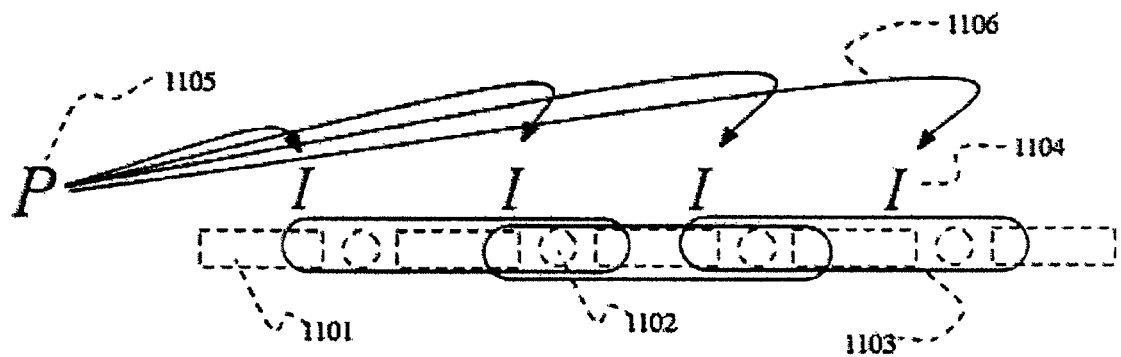
FIG. 11 shows a process of forming semantic b-frames.

FIG. 11 schematically illustrates the process of forming sb-frames. Such a frame collects information from the previous and next process infons. Each of these in turn is collecting from an adjacent pair. The frame identifies semantic features that are carried from one infon to the next, using information from the value feature situation.

In terms of this example, the process is one in which some desirable feature is encoded in the left hand side, F 1105, together with other features. An image of that one feature is distributed as I 1104 in each process infon 1101. In other words, the processes in part carry some record of how that feature possibly matures as it is carried from one process to another. If the feature is a special sort of shaping for style, then some processes may stepwise produce the valued effect of the shape.

The sb-frame 1103 therefore captures some elements from an infon and its I, and similarly from the adjacent infons and the relevant connectives 1102. The process by which F 1105, I 1104 and their relationship 1106 are instanced is by a parallel set of computations not yet described in this section. This process is that described as $F^4$ and is illustrated as part of step 503 in FIG. 5, part of recognition units 602 in FIG. 6 and step 706 in FIG. 7.

This function $F^4$ is a relatively unsophisticated operation. But it requires some large scale processes not well supported in SPADE. For example, in this illustrative case, some well understood Bayesian processes will be accessed through the API 707.

Now some factoring of the sb-frames as the result of $F^4$ is performed in order to support the later group-theoretic wreath product. This process is shown in steps 709 and 712 of FIG. 7. Each identified sb-frame within the process flows becomes a fiber in a fiber group.

This refactoring action moves the conceptual framework from set theory (where the first class citizens are logical elements) to group theory (where the first class citizens are mathematical relationships). The feature patterns that are collected in the sb-frame representation are sets. The operation simply shifts them to groups by incorporating the transition symmetries recognized in the shift from one state of the frame to the next. Another way to say this: the new fibers represent the recoverable history of how the features of interest emerge from the processes in the specific, candidate process sequence.

There is a parallel process of left hand side objects, but in a different type space. A collection of left hand side groups $P_x^c$ pre-exists before the processes we describe here, though in an advanced, "business intelligence aware" implementation the ontologies co-evolve with the process flows. These ontologies encode feature knowledge as infons.

Some features will be associated with enterprises. For example, desirable features of an enterprise may include: making profit, conforming with laws, helping the community, improving human resources and so on. Features associated with processes may be focused on time, cost and quality, but could involve higher order criteria like rounding out shifts, investing in geographic areas and experimenting with new processes. These ontologies may be dynamic and based on changing member or collective enterprise strategies.

Some of these feature ontologies will associate with products or customer value. There will be functional features associated with a real need, branding or style features and secondary features such as reliability or return policies.

This collection of $P_x^c$ gives us the "situations" that will be matched with processes and partners on the right. The example implementation of the invention will be used in one of two ways, though as mentioned, a version can exist where both modes co-exist. One embodiment has a set of product and strategic features you wish to support so therefore be looking for the optimum set of processes and partners to create the product while best supporting the strategy. Another embodiment has tentatively allied members with unused resources and capabilities and they are looking for a product and market.

$P_x^c$ are groups and will be used in the example implementation as control groups. They will have entered via a parallel set of streams, shown in FIG. 6 as situation control units 606. FIG. 7 has the ungrouped infon streams for both the processes and features entering step 701. Feature groups bypass (via 705, 711) certain functions that create the sb-frames and the associated fibers.

Figure 12:
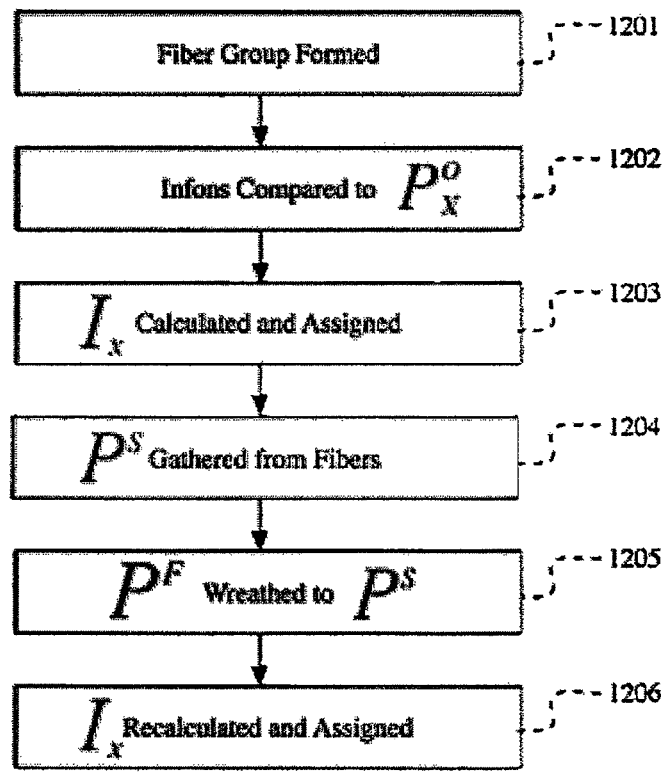
FIG. 12 shows steps in a process of applying wreath products.

FIG. 12 shows a flow chart of the processes of wreathing, indicated in different ways as pattern references 502 in FIG. 5, the wreathing engine 604 of FIG. 6 and step 714 of FIG. 7.

The flow starts at step 1201 with well formed sb-frames by processes already described. The infons in the process flow, without using information from the sb-frames, are referred (in step 1202) to a collection of process ontologies $P_x^c$ that are the reference for what the processes are. This is similar to the ordinary process of ontological registration, but it happens here in a group context.

Step 1203 captures this interpretation of each process infon as $I_x$, which distributes the links from the ontology infons to the process infons, via the wreath product.

This will factor in the later property of ontological recovery for users that want to trace details of the process operation. Such recovery is commonly associated with performance measurement. This uses $F^5$ as described earlier.

The $I_x$ "infon provenance" (meaning the entire transformative history of a single right hand element) is now collected from the right hand side, using infons from the sb-frames as illustrated in FIG. 11. This occurs in step 1204, using the results of step 1203, and the result is a provenance value for the entire process stream P. The function $F^5$ is again used.

Now, in step 1205, and using $F^6$, the feature control group $P^c$ is applied to the just calculated fiber group P of the process stream. The wreath product is a well understood group theoretic operator. The qualities of this operator, its iterations and internal structure are determined by the domain of application.

The newly wreathed P has its corresponding $I_x$ extracted and redistributed to the process infons as shown in step 1206. This wreathing happens a great many times, as there are many process streams with many different "interpretations" (based on different local ontologies, wreathed by many feature control groups. These feature control groups are different product and payoff strategies. All of the operations of FIG. 12 are in group theoretic space.

Figure 13:
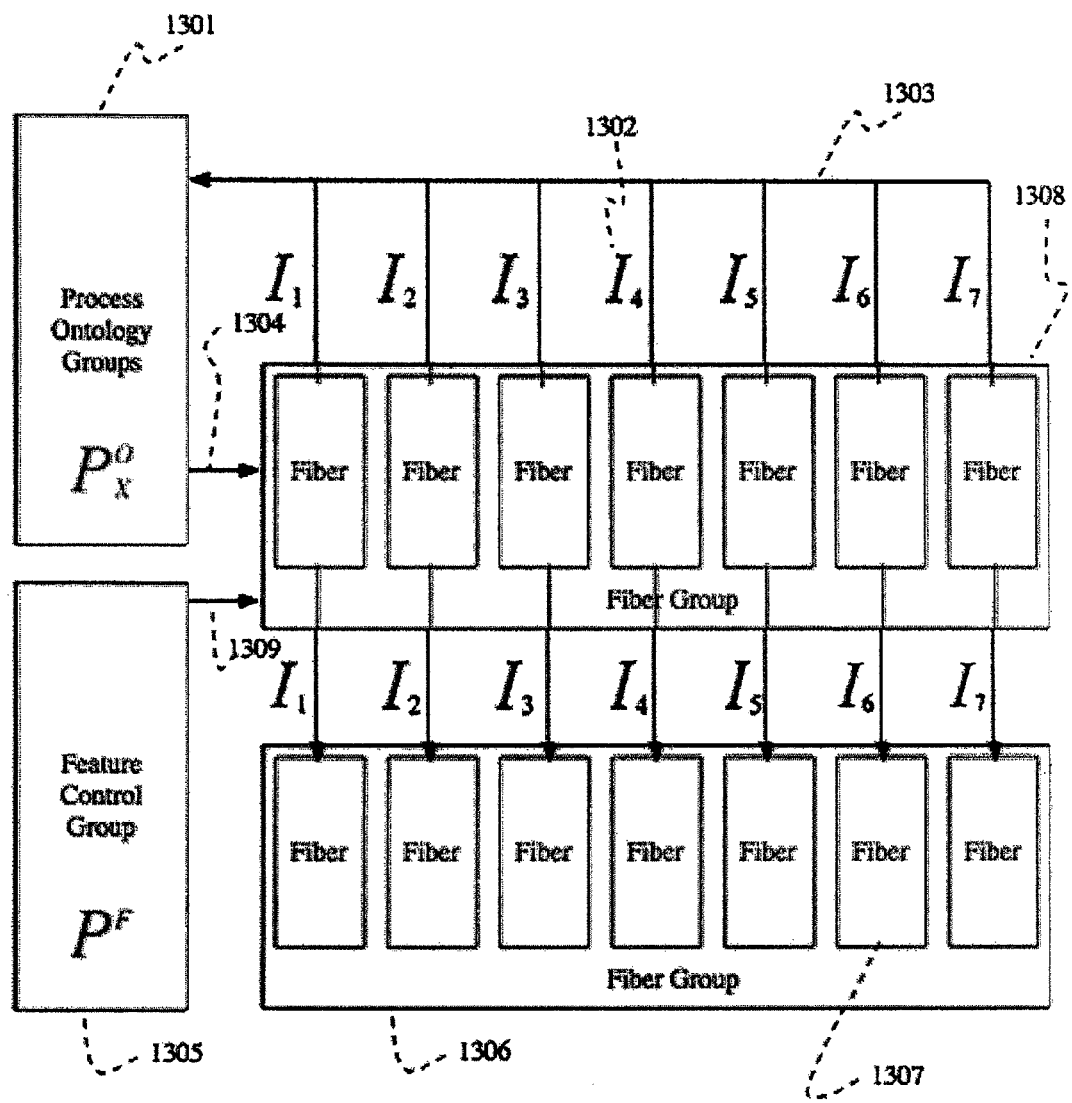
FIG. 13 shows elements used in applying wreath products.

FIG. 13 schematically shows the process of how the wreath product performs the semantic transforms within 605, and designated as 1204. Step 1301 is the group representing the structure of the process ontology statements. These statements are not shown in FIG. 13, but elsewhere are indicated at the top of FIGS. 1, 2 and 3.

A candidate process flow 1308 is structured as a fiber group. That means that each fiber has an associated provenance quality $I_x$, 1302. Those provenance qualities are unevaluated at this stage, corresponding to unsituated processes. In other words, the processes may or may not make something, but until we know what that something is, we cannot say how well or even if the processes will work.

In the next step, corresponding to step 1202 of FIG. 12, the several $I_x$ gain values when evaluated against the ontology structure $P_x^c$. This is shown by the line 1303, with the values returned with 1305. In practical terms, this gives some local partially situated interpretation to each process 1307. For instance, the infon that references drilling a hole is associated with an explanation via 1303 to just what "drilling" means. The fibers are not yet related to each other, so the value of the sequence of operations is yet unknown.

Control group 1305 expresses one desired set of product and enterprise strategic values. For instance, it may contain a design for a next generation tablet that has a variety of physical, functional, style and software features. It may contain strategic enterprise features such as capturing market share for paid application downloads at the cost of near term profit. And it may have special enterprise features relating to environmental friendliness. These can be captured in several component control groups, but for clarity in this example, we assume the entire product is in one control group.

The next step, corresponding to path 1309, has the actual wreath product where control group 1305 is wreathed into the uninterpreted fiber group. The resulting product will be a transformed fiber group 1306. Each fiber will be "resituated" and support the situation of the product or not. The actual infons that are at the root of the fiber group are not changed in any way; only the $I_x$ are, having been modified to possibly enrich latent sb-frames. This is equivalent to steps 1205 and 1206 in FIG. 12.

The resulting process stream as an enhanced fiber group may be fed back for refinement, as indicated in computed streams 519 of FIG. 5 and path 612 of FIG. 6. In this case, the $I_x$ have a better starting point than of candidate process flow 1308.

These processes of massive, iterative wreathing can be supported by programming techniques that are accessed through the API 715 of FIG. 7. Thus, the described embodiments of the invention include massive numbers of operations but of a simple type that can be scalably programmed. While described with reference to the virtual enterprise embodiment, a similar set of steps can be followed for the intelligence embodiment using different data.

What is claimed as new and desired to be protected by Letters Patent of the United States is:

1. A computer processor system for processing data, comprising:
   a communications receiver configured to receive a plurality of streams of data from a plurality of respective sensors, wherein the sensors include: at least one video sensor, at least one satellite sensor, at least one acoustic sensor, and at least one document source;
   one or more computer processors configured to:
   identify features of the streams that match known patterns based on the streams of data from the plurality of sensors, using methods specific to each type of the sensors, and process the identified features into infon data structures comprising a relation and at least two parameters on which the relation works;
   form semantic binary frames (sb-frames) based on the infon data structures, each sb-frame comprising a segment of data from a stream and semantic information that is universal to the streams of data received from each type of sensor that includes natural language expressions describing the segment of data based on an identified purpose of the computer processor system, and each sb-frame being formed using at least one infon data structure in a respective stream of data, a previous infon data structure in the stream of data, and a next infon data structure in the stream of data;
   form fiber groups based on the sb-frames, each fiber group comprising a plurality of sb-frames related by logical natural language expressions that relate the segment of data to other segments of data in the stream;
   identify situations of interest as control groups based on the fiber groups; and
   receive the sb-frames and the control groups as input, and process the sb-frames to identify a presence of situations of interest and produce a situated deduction.

2. The computer system of claim 1, wherein the one or more computer processors configured to process the sb-frames is a wreathing engine and the wreathing engine is configured to synthesize the sb-frames that conform to the control groups to form a series of facts as one or more situated deductions.

3. The computer system of claim 2, wherein the wreathing engine is configured to compare the situated deductions to predetermined threat profiles.

4. The computer system of claim 3, wherein the wreathing engine is configured to trigger an alert if the situated deductions match the predetermined threat profiles.

5. The computer system of claim 1, wherein the semantic information of the sb-frame is data that indicates what the segment of data may represent in a situation.

6. The computer system of claim 1, wherein separate computer processors are configured to perform the steps of forming sb-frames, identifying situations of interest as control groups, and processing the sb-frames to identify a presence of situations of interest.

7. The computer system of claim 1, wherein the control groups are represented as a mathematical expression.

8. The computer system of claim 1, wherein the streams comprise structured data.

9. The computer system of claim 1, further comprising a computer storage medium storing a plurality of known patterns as recognition processor unit references.

10. The computer system of claim 1, wherein the sb-frames are formed using ontological references that are stored on a computer storage medium.

11. The computer system of claim 1, wherein the situations of interest are stored as mission situation references on a computer storage medium.

12. The computer system of claim 1, comprising a plurality of recognition processor units configured to identify features of the streams and form sb-frames, each of the plurality of recognition processor units specially designed for a particular media type and/or recognition need.

13. The computer system of claim 1, further comprising a router that routes the processed sb-frames to an analysis device.

14. The computer system of claim 1, wherein the plurality of streams of data comprise one or more process flows from each of a plurality of business enterprises, and the situations of interest are products.

15. The computer system of claim 1, wherein the control group further comprises information about the reasoning process used to characterize the situations of interest.

16. A method of processing data, comprising:
receiving, using a communications receiver, a plurality of streams of data from a plurality of respective sensors, wherein the sensors include: at least one video sensor, at least one satellite sensor, at least one acoustic sensor, and at least one document source;
identifying features of the streams that match known patterns based on the streams of data from the plurality of sensors, using methods specific to each type of sensor, and processing the identified features into infon data structures comprising a relation and at least two parameters on which the relation works;
forming semantic binary frames (sb-frames) based on the infon data structures, each sb-frame comprising a segment of data from a stream and semantic information that is universal to the streams of data received from each type of sensor that includes natural language expressions describing the segment of data based on an identified purpose of the computer processor system, and each sb-frame being formed using at least one infon data structure in a respective stream of data, a previous infon data structure in the stream of data, and a next infon data structure in the stream of data;
form fiber groups based on the sb-frames, each fiber group comprising a plurality of sb-frames related by logical natural language expressions that relate the segment of data to other segments of data in the stream;
identifying control groups based on the fiber groups characterizing situations of interest;
synthesizing sb-frames that conform to the control groups to form a series of facts as one or more situated deductions.

17. A device with one or more non-transitory computer-readable mediums storing a program that, when executed, causes a computer processor to:
receive, using a communications receiver, a plurality of streams of data from a plurality of respective sensors, wherein the sensors include: at least one video sensor, at least one satellite sensor, at least one acoustic sensor, and at least one document source;
identify features of the streams that match known patterns based on the streams of data from the plurality of sensors, using methods specific to each type of sensor, and process the identified features into infon data structure comprising a relation and at least two parameters on which the relation works;
form semantic binary frames (sb-frames) based on the infon data structures, each sb-frame comprising a segment of data from a stream and semantic information that is universal to the streams of data received from each type of sensor that includes natural language expressions describing the segment of data based on an identified purpose of the computer processor system, and each sb-frame being formed using at least one infon data structure in a respective stream of data, a previous infon data structure in the stream of data, and a next infon data structure in the stream of data;
form fiber groups based on the sb-frames, each fiber group comprising a plurality of sb-frames related by logical natural language expressions that relate the segment of data to other segments of data in the stream;
identify control groups based on the fiber groups characterizing situations of interest;
synthesize sb-frames that conform to the control groups to form a series of facts as one or more situated deductions.

* * * * *